United States Patent
Abdallah et al.

(10) Patent No.: US 9,877,350 B2
(45) Date of Patent: Jan. 23, 2018

(54) METHOD AND SYSTEM FOR P2P COMMUNICATIONS AND DECENTRALIZED SPATIAL SHARING IN WIRELESS NETWORKS WITH DIRECTIONAL TRANSMISSIONS

(71) Applicant: SONY CORPORATION, Tokyo (JP)

(72) Inventors: Ramy Medhat Abdallah, San Jose, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 15/175,625

(22) Filed: Jun. 7, 2016

(65) Prior Publication Data

US 2017/0353984 A1    Dec. 7, 2017

(51) Int. Cl.
*H04W 72/04* (2009.01)
*H04W 76/02* (2009.01)
(Continued)

(52) U.S. Cl.
CPC .......... *H04W 76/023* (2013.01); *H04L 5/006* (2013.01); *H04L 5/0055* (2013.01); *H04L 43/16* (2013.01);
(Continued)

(58) Field of Classification Search
CPC ... H04W 76/023; H04W 16/32; H04W 72/04; H04L 5/0055; H04L 5/006; H04L 43/16
See application file for complete search history.

(56) References Cited

U.S. PATENT DOCUMENTS

| | | |
|---|---|---|
| 8,422,961 B2 | 4/2013 | Kafle |
| 8,730,873 B2 | 5/2014 | Nikula et al. |

(Continued)

FOREIGN PATENT DOCUMENTS

| | | |
|---|---|---|
| WO | 2013085468 A1 | 6/2013 |
| WO | 2014/124048 A1 | 8/2014 |

OTHER PUBLICATIONS

European Patent Office (EPO), International Search Report and Written Opinion dated Aug. 24, 2017, related PCT international application No. PCT/US2017/034640, pp. 1-17, with claims searched, pp. 18-23.

(Continued)

*Primary Examiner* — Wei Zhao
(74) *Attorney, Agent, or Firm* — O'Banion & Ritchey LLP; John P. O'Banion

(57) ABSTRACT

Beamformed directional wireless communications are described that provide for spatial re-use that allows multiple pairs of peer-to-peer (P2P) links to communicate simultaneously over the same channel in the same spatial vicinity, without contention, and independent of centralized control. The spatial re-use improves network throughput by sharing spectrum resource among multiple links. Beamformed training includes obtaining best sector and least sector information by all stations. Prior to performing an independent P2P communication, antenna array sector information is checked, to assure that the sector to be selected is not impinging interference on other P2P interactions, then a request is made to a target station. The target station also refers to its sector information, and if no conflict is found it accepts and acknowledges the request, upon which it receives the P2P communication.

20 Claims, 17 Drawing Sheets

(51) Int. Cl.
  *H04W 16/28*   (2009.01)
  *H04L 5/00*    (2006.01)
  *H04L 12/26*   (2006.01)
  *H04L 29/12*   (2006.01)

(52) U.S. Cl.
  CPC ......... *H04L 61/6022* (2013.01); *H04W 16/28* (2013.01); *H04W 72/0446* (2013.01)

(56) References Cited

U.S. PATENT DOCUMENTS

| | | | |
|---|---|---|---|
| 9,635,705 B2* | 4/2017 | Lu | H04W 84/00 |
| 2014/0233551 A1 | 8/2014 | Wentink et al. | |
| 2015/0071185 A1 | 3/2015 | Trainin | |
| 2016/0255613 A1* | 9/2016 | Faerber | H04W 16/10 370/330 |
| 2017/0026205 A1* | 1/2017 | Agee | H04L 25/08 |

OTHER PUBLICATIONS

Li, Xin et al., "Throughput Analysis of Ad Hoc Networks Using Multibeam Antennas with Priority-Based Channel Access Scheduling", IEEE Wireless Communications and Networking Conference 2008, Mar. 31, 2008, pp. 1651-1655.

* cited by examiner

| Frame control | Duration | RA | TA | SSW | SSW feedback | FCS |
|---|---|---|---|---|---|---|
| 2 | 2 | 6 | 6 | 3 | 3 | 4 |

Octets:

FIG. 6

| B0 | B1    B9 | B10    B15 | B16    B17 | B18    B23 |
|---|---|---|---|---|
| Direction | CDOWN | Sector ID | DMG Antenna ID | RXSS Length |
| 1 | 9 | 6 | 2 | 6 |

Bits:

FIG. 7

| B0    B8 | B9    B10 | B11    B15 | B16 | B17    B23 |
|---|---|---|---|---|
| Total sectors in ISS | Number of RX DMG antennas | Reserved | Poll required | Reserved |
| 9 | 2 | 5 | 1 | 7 |

Octets:

FIG. 8A

| B0    B5 | B6    B7 | B8    B15 | B16 | B17    B23 |
|---|---|---|---|---|
| Sector select | DMG antenna select | SNR report | Poll required | Reserved |
| 6 | 2 | 8 | 1 | 7 |

Bits:

FIG. 8B

| Frame control | Duration | RA | TA | SSW feedback | BRP request | Beamformed link maintenance | FCS |
|---|---|---|---|---|---|---|---|
| 2 | 2 | 6 | 6 | 3 | 4 | 1 | 4 |

Octets:

FIG. 9

| Frame control | Duration | RA | TA | SLS-P IE | FCS |

FIG. 16A

| IE ID | Length | STA IDs | Timing offsets | Usage |

FIG. 16B

| Frame control | Duration | RA | TA | SSW | FCS |

FIG. 16C

| Frame control | Duration | RA | TA | SSW feedback 1 | SSW feedback 2 | ••• | SSW feedback N | FCS |

FIG. 17

| STA ID | Sector select | Antenna select | SNR report |

FIG. 18

| Frame control | Duration | RA | TA | Allocation 1 field | Allocation 2 field | Extendible | FCS |

FIG. 24

| Source AID | Destination AID | Start time | AllocationDuration |

FIG. 25

| Frame control | Duration | RA | TA | P2P ACK | Allocation ACK | Extended Allocation start time | Allocation Duration | Extendible | BF Control | FCS |

FIG. 26

| BF Training | IsInitiatorTXSS | IsRXSS | RXSS Length |

FIG. 27

METHOD AND SYSTEM FOR P2P COMMUNICATIONS AND DECENTRALIZED SPATIAL SHARING IN WIRELESS NETWORKS WITH DIRECTIONAL TRANSMISSIONS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

The technology of this disclosure pertains generally to wireless network communication, and more particularly to decentralized spatial sharing in wireless communication networks.

2. Background Discussion

As there is a need for maximizing communication link usage, techniques of spatial (frequency) re-use have arisen in which two or more links share the same frequency channel in the same spatial vicinity at the same time.

FIG. 1 depicts an example of spatial frequency re-use in a home setting having a single PBSS control point (PCP) and four stations, with STA 1 depicted as a printer, STA 2 a video camera, STA 3 a laptop computer, and STA 4 a MP3 player, or similar audio/video recording/playback device.

FIG. 2A and FIG. 2B depict the use of beamforming used in wireless communications. Highly directive wireless communications often make use of beamforming, which is a communication that takes advantage of using a large number of antennas with phase control to steer transmission towards a desired radio direction. In millimeter-wave (mmWave) communications the link budget is poor due to high free space path loss (FSPL), large $O_2/H_2O$ absorption, and large blockage by objects. Beamforming and high signal attenuation creates less interference between communication links, as is seen in the beamformed signal patterns shown in FIG. 2A with the narrow signal beam, compared with a traditional antenna pattern seen in FIG. 2B in which interference arises between these two stations. With the use of beamformed communications, spatial re-use in mmWave communications is a particularly attractive transmission mechanism.

Accordingly, a need exists for efficient beamforming training, interference assessment, and fast non-centralized P2P link establishment. The present disclosure fulfills these needs, while providing additional wireless networking benefits.

BRIEF SUMMARY

An apparatus and method are described with enhanced spatial re-use that allows multiple pairs of peer-to-peer (P2P) links to communicate simultaneously over the same channel in the same spatial vicinity, without centralized control. It will be appreciated that spatial re-use improves network throughput by sharing the spectrum resource among multiple links.

However, state-of-the art spatial sharing/re-use mechanisms require either centralized coordination and/or require excessive overhead to perform training and interference assessment.

In addition, it will be noted that fast P2P link establishment is crucial for certain wireless applications. State-of-the art mmWave P2P link establishment requires initial time for training and incurs overhead in signaling with the AP/PCP.

The present disclosure describes enabling mechanisms for efficient beamforming training, interference assessment, and fast decentralized P2P link establishment. These mechanisms provide for beamforming training in which every STA is allowed to acquire best transmit sector information towards other STAs in only one protocol phase. Spatial re-use logic is provided which independently executes at each STA. In addition, a fast directional peer-to-peer (P2P) link establishment mechanism is provided.

Thus, the present disclosure provides for a decentralized spatial sharing mechanism, which utilizes spatial sharing interference assessment logic that utilizes beamformed training feedback that shares best sector information and in at least one embodiment also shares least sector information. Embodiments also describe sharing signal-to-noise information for these sectors (e.g., best sector and/or least sectors). An independent P2P request frame, and P2P ACK frame are described, along with additional data structures for facilitating this independent P2P communication without intervention by a central coordinator.

The present disclosure is directed to wireless networked communications, and is particularly well-suited for mmWave WLAN application. However, the disclosed apparatus and methods are applicable to numerous other wireless apparatus, for example wireless personal area networks (WPAN) and also outdoor wireless communications with highly directional transmissions. Thus, the target applications can range from WiFi like networks, Internet of things (IoT) applications, Next generation cellular networks, including femto/small cells and HetNet communications technology, and other forms of wireless networks.

A number of terms are utilized in the disclosure whose meanings are generally utilized as described below.

A-BFT: Association-Beamforming Training period; a period announced in the beacons that is used for association and BF training of new Stations joining the network.

AID: Association Identifier; whenever a station associates to an AP, the station receives an AID. The AP uses this AID to keep track of the stations that are associated and the members of the BSS.

Antenna weight vector (AWV): A vector of weights describing the excitation (amplitude and phase) for each element of an antenna array.

AoA (AoD): Angle of Arrival (Departure); the direction of propagation of a radio-frequency wave incident (transmitted) on (from) an antenna array.

AP: access point; an entity that contains one station (STA) and provides access to the distribution services, through (via) the wireless medium (WM) for associated STAs.

ATI: announcement transmission interval (ATI).

Beamforming (BF): A directional transmission that does not use an omnidirectional antenna pattern or quasi-omni antenna pattern. It is used at a transmitter to improve the received signal power or signal-to-noise ratio (SNR) at an intended receiver.

Beam combining: A method of combining the power contained in various beams at the receiver for each independent data stream.

BSS: basic service set; A set of stations (STAs) that have successfully synchronized with an AP in the network.

BI: The Beacon Interval is a cyclic superframe period that represents the time between beacon transmission times.

BRP: BF refinement protocol; A BF protocol that enables receiver training and iteratively trains the transmitter and receiver sides to achieve the best possible directional communications.

CBAP: contention-based access period; The time period within the data transfer interval (DTI) of a directional multi-gigabit (DMG) BSS where contention-based enhanced distributed channel access (EDCA) is used.

DTI: Data Transfer Interval; the period whereby full BF training is permitted followed by actual data transfer. It can include one or more service periods (SPs) and contention-based access periods (CBAPs).

MAC address: A medium access control (MAC) address.

MCS: A modulation and coding scheme; an index that can be translated into the PHY layer data rate.

Omni directional: A non-directional antenna mode of transmission.

Quasi-omni directional: A directional multi-gigabit (DMG) antenna operating mode with the widest beamwidth attainable.

PCP: stands for PBSS control point.

Receive sector sweep (RXSS): Reception of Sector Sweep (SSW) frames through (via) different sectors, in which a sweep is performed between consecutive receptions.

RSSI: receive signal strength indicator (in dBm).

Sector-level sweep (SLS) phase: A BF training phase that can include as many as four components: an initiator sector sweep (ISS) to train the initiator, a responder sector sweep (RSS) to train the responder link, an SSW Feedback, and an SSW ACK.

SNR: The received signal-to-noise ratio (in dB). Other similar mechanisms for determining signal integrity are considered to be cumulative and/or synonymous with SNR, and are thus not separately described herein.

SP: scheduled service period (SP); the SP that is scheduled by the access point (AP). Scheduled SPs start at fixed intervals of time.

Spectral efficiency: is the information rate that can be transmitted over a given bandwidth in a specific communication system, usually expressed in bits/sec/Hz.

STA: Station: a logical entity that is a singly addressable instance of a medium access control (MAC) and physical layer (PHY) interface to the wireless medium (WM).

Sweep: A sequence of transmissions, separated by a short beamforming interframe space (SBIFS) interval, in which the antenna configuration at the transmitter or receiver is changed between transmissions.

Transmit sector sweep (TXSS): Transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 6 is a data field format of the SSW control frame as utilized in 802.11ad.

FIG. 7 is a data field format for SSW field in the control frame for 802.11ad.

FIG. 8A and FIG. 8B are data field format for the SSW feedback field, with the format seen in FIG. 8A utilized when transmitted as part of an ISS, and the format seen in FIG. 8B utilized when not transmitted as part of an ISS, as per the 802.11ad standard.

FIG. 9 is a data field format for the sector sweep feedback frame (SSW-feedback) frame in the 802.11ad standard.

FIG. 16A is a data field format for an SLS beamforming polling frame according to an embodiment of the present disclosure.

FIG. 16B is a data field format of an SLS polling (SLS-P) Information Element (IE) according to an embodiment of the present disclosure.

FIG. 16C is a data field format for a broadcast SLS SSW frame format according to an embodiment of the present disclosure.

FIG. 17 is a data field format for a broadcast SLS SSW feedback frame according to an embodiment of the present disclosure.

FIG. 18 is a data format for an SSW feedback field according to an embodiment of the present disclosure.

FIG. 24 is a data field format for a P2P request frame according to an embodiment of the present disclosure.

FIG. 25 is a data field format for a P2P allocation information according to an embodiment of the present disclosure.

FIG. 26 is a data field format for a P2P ACK frame according to an embodiment of the present disclosure.

FIG. 27 is a data field format for P2P BF training according to an embodiment of the present disclosure.

DETAILED DESCRIPTION

1. State of the Art SLS Protocol in mmWave Technology.

Figure 1:
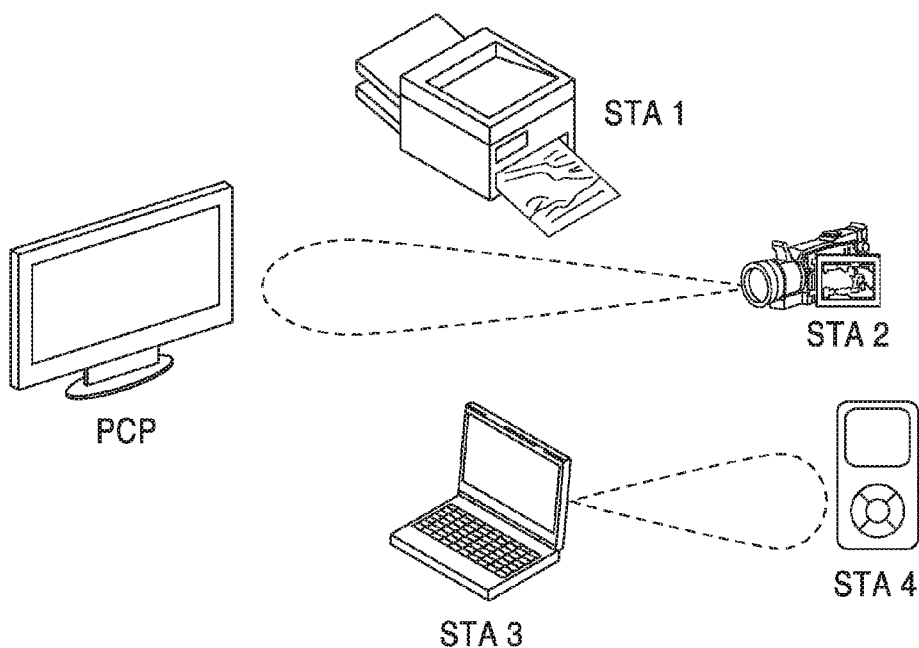
FIG. 1 is a block diagram of spatial re-use in a home setting.
Figure 2A:
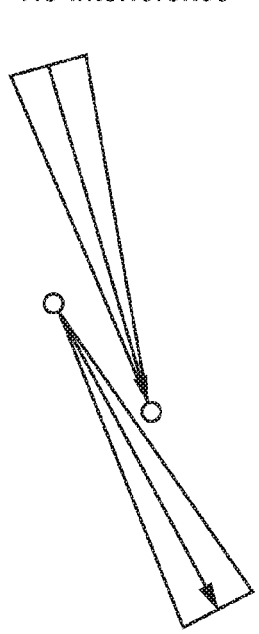
FIG. 2A and FIG. 2B are antenna path diagrams, shown for highly directive (beamformed) transmission in FIG. 2A, and for less directional antennas in FIG. 2B.
Figure 2B:
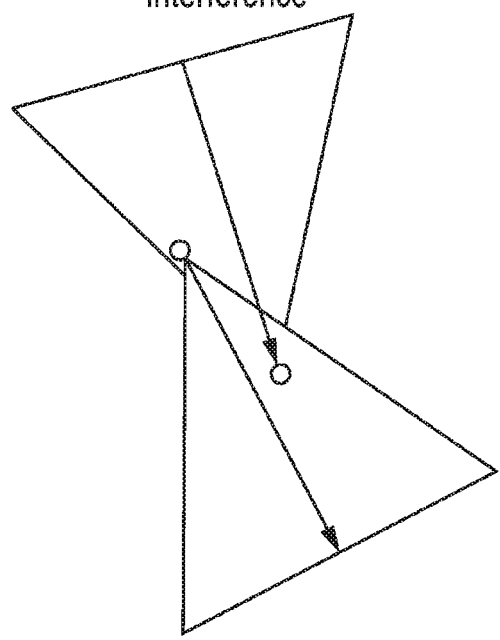
Figure 3:
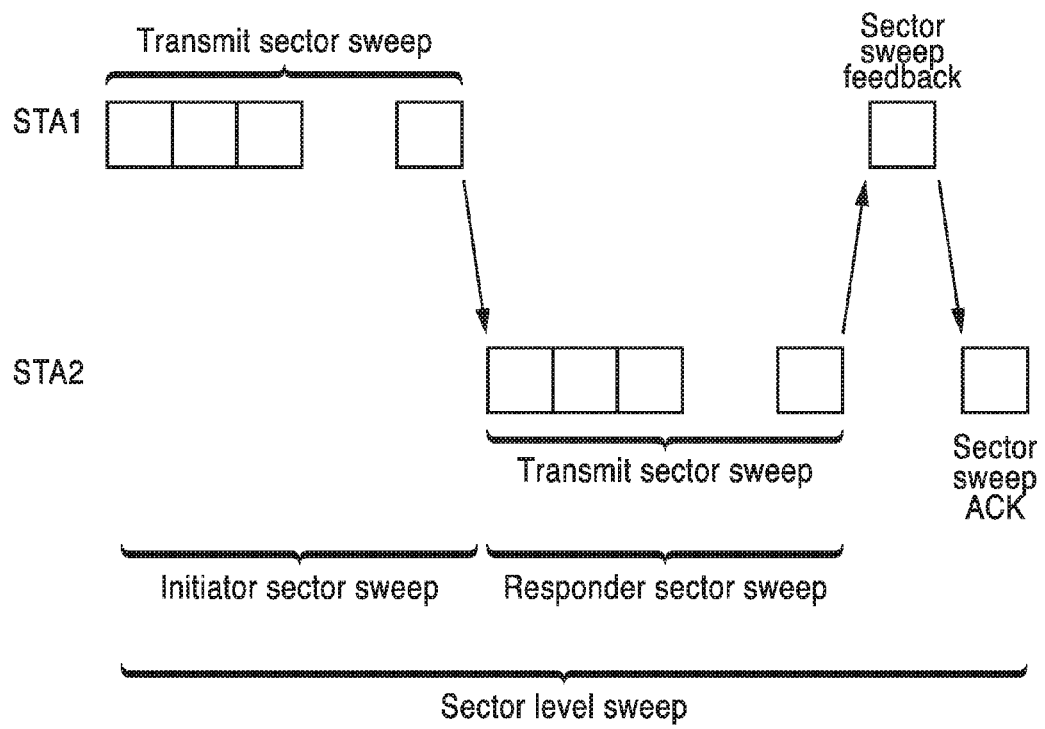
FIG. 3 is an air time diagram of sector level sweeping (SLS) between a transmitter and responder.

FIG. 3 depicts a state of the art SLS protocol in the IEEE 802.11ad protocol between a first station (STA 1) and a second station (STA 2). A transmit sector sweep (TXSS) is seen for a first station (STA 1) as an initiator sector sweep, and another station (STA 2) responds with its own TXSS. STA 1 then generates SSW feedback, to which STA 2 responds with an ACK. Each packet in the transmit sector sweep includes countdown indication (CDOWN), a Sector ID, and an Antenna ID. The best Sector ID and Antenna ID information are fed back through the Sector Sweep (SSW) Feedback and Sector Sweep (SSW) acknowledgement (ACK) packets.

Figure 4:
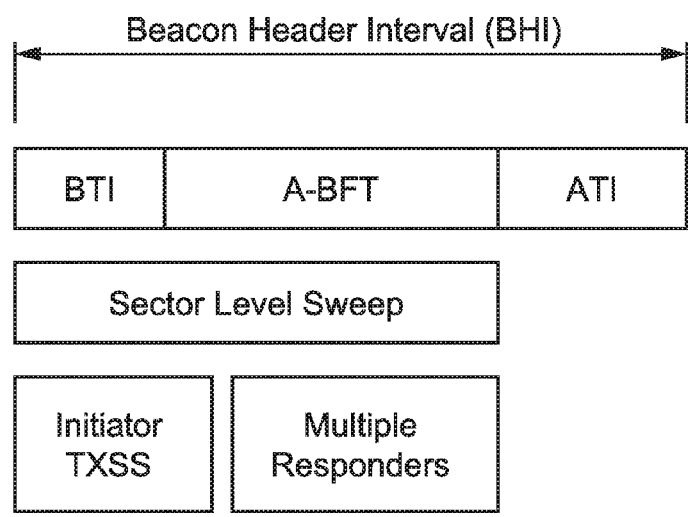
FIG. 4 is an air-time diagram of a beacon header interval (BHI) in which initiator and multiple responder TXSS are performed within the superframe header.

FIG. 4 depicts an example of the 802.11ad SLS protocol, such as for application to multiple STAs. Shown in the figure is the breakdown of a beacon header interval (BHI), seen broken down into a beacon transmission interval (BTI), association-beamforming training period (A-BFT), and announcement transmission interval (ATI). The sector level sweep (SLS) period is seen as comprising the BTI and A-BFT intervals, which is shown further divided down into initiator TXSS, and multiple responder periods. Consider the SLS that occurs during the beacon header interval (BHI) of the 802.11ad super frame. The AP performs the initiator TXSS at the beacon transmission interval (BTI). The STAs that hear (monitor and receive) this information, perform a responder TXSS during the A-BFT period. However, the STAs perform responder TXSS in an uncoordinated fashion, since the STAs perform random back-off, with collision being assumed if no SSW feedback is received from the AP. The SSW ACK could be transmitted during the ATI.

Figure 5:
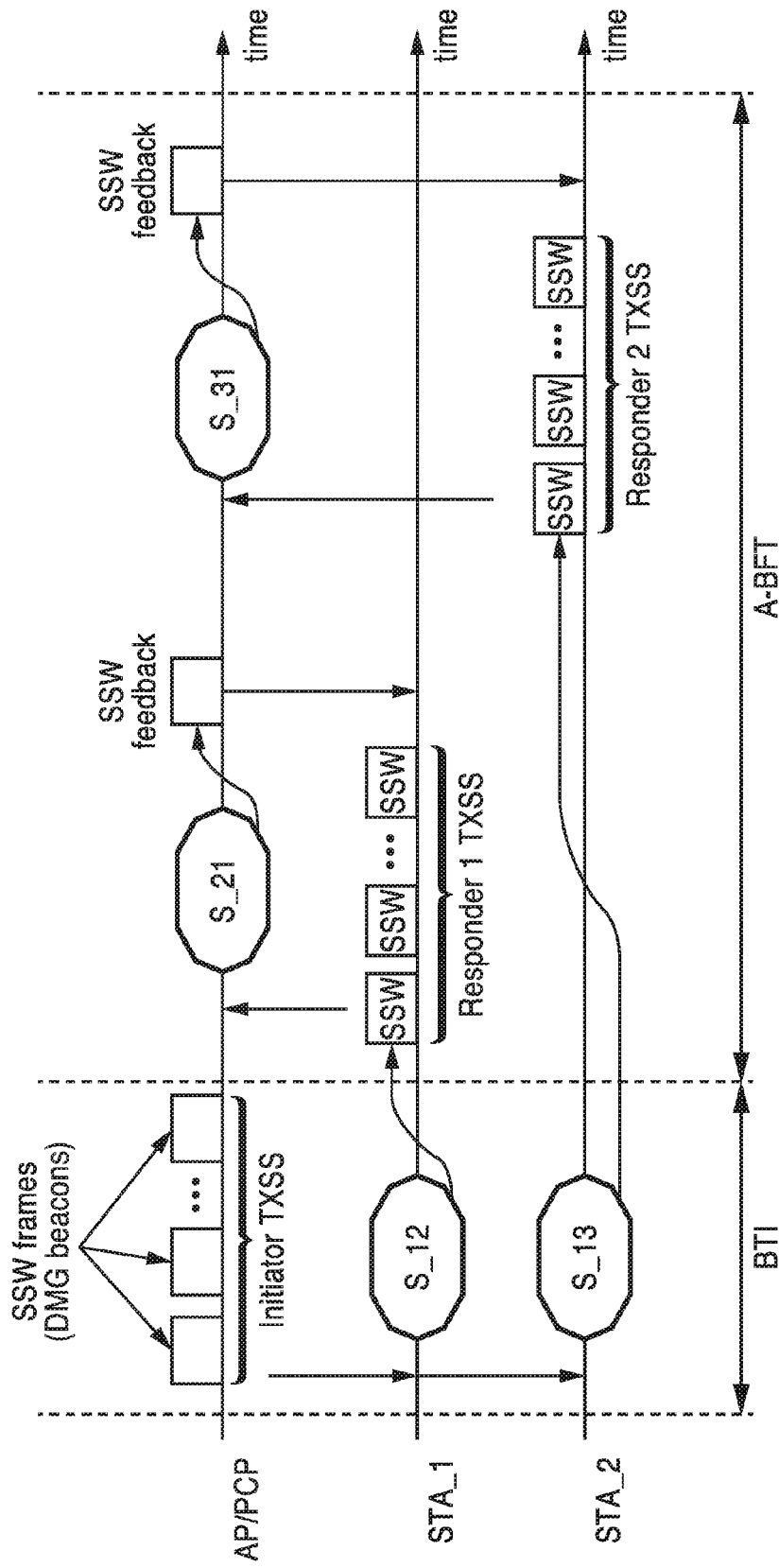
FIG. 5 is a message sequence of SLS BF training between AP and multiple STAs, in the 802.11ad standard.

FIG. 5 depicts a message sequence exemplifying SLS BF training procedure between an AP and multiple STAs in 802.11ad. In the figure is shown the activity by the AP/PCP (PCP stands for PBSS control point) in the top row with activity for STA 1 and STA 2 in the rows beneath. During the BTI interval an initiator TXSS is performed by AP/PCP using SSW frames (DMG beacons) which is received by STA 1 (state S_12), and STA 2 (state S_13). During the A-BFT interval, STA 1 is the first responder to perform a TXSS, showing SSW frames back to the AP/PCP. The responder TXSS are received (state S_21), and the AP/PCP sends SSW feedback to STA 1. Some period later in the A-BFT, STA 2 performs a response TXSS, which is received (state S_31) by the AP/PCP which responds to STA 2 with SSW feedback.

FIG. 6 depicts an SSW control frame as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame. The SSW field and the SSW Feedback field are defined below.

FIG. 7 illustrates data fields for the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of an SSW frame. The SSW Feedback field is defined below.

FIG. 8A and FIG. 8B depict an SSW feedback field. The format shown in FIG. 8A is used when transmitted as part of an ISS, while the format of FIG. 8B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The Poll Required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

FIG. 9 depicts data fields for the sector sweep feedback frame (SSW-feedback) frame in the 802.11ad standard. The Duration field is set to 0 when the SSW-Feedback frame is transmitted within an association beamforming training (A-BFT). Otherwise, the duration field is set to the time, in microseconds, until the end of the current allocation. The RA field contains the MAC address of the STA that is the intended destination of SW-Feedback frame. The TA field contains the MAC address of the STA transmitting the SSW-Feedback frame. The BRP request field provides information necessary for initiating the BRP process. The Beamformed Link Maintenance field provides the DMG STA with the value of a beam Link Maintenance Time. If the beam Link Maintenance Time elapses, the link operates in quasi-omni Rx mode.

1.1. Centralized Spatial Sharing Mechanism in 802.11ad.

The spatial sharing decisions in 802.11ad are performed in a centralized manner. The PCP/AP request STAs to perform measurements to assess the possibility to perform spatial sharing, which incurs signaling overhead. The spatial re-use logic is run at the PCP/AP, in which the PCP/AP extracts metrics from the measurement reports to decide whether to allow spatial sharing or not. The stations involved in a SP that is a candidate to be sharing the spectrum with another SP, perform the spatial sharing measurements only after these STAs have established a beamformed link with each other in the past. The STAs use the same receive beamforming pattern when performing the channel measurements.

Figure 10:
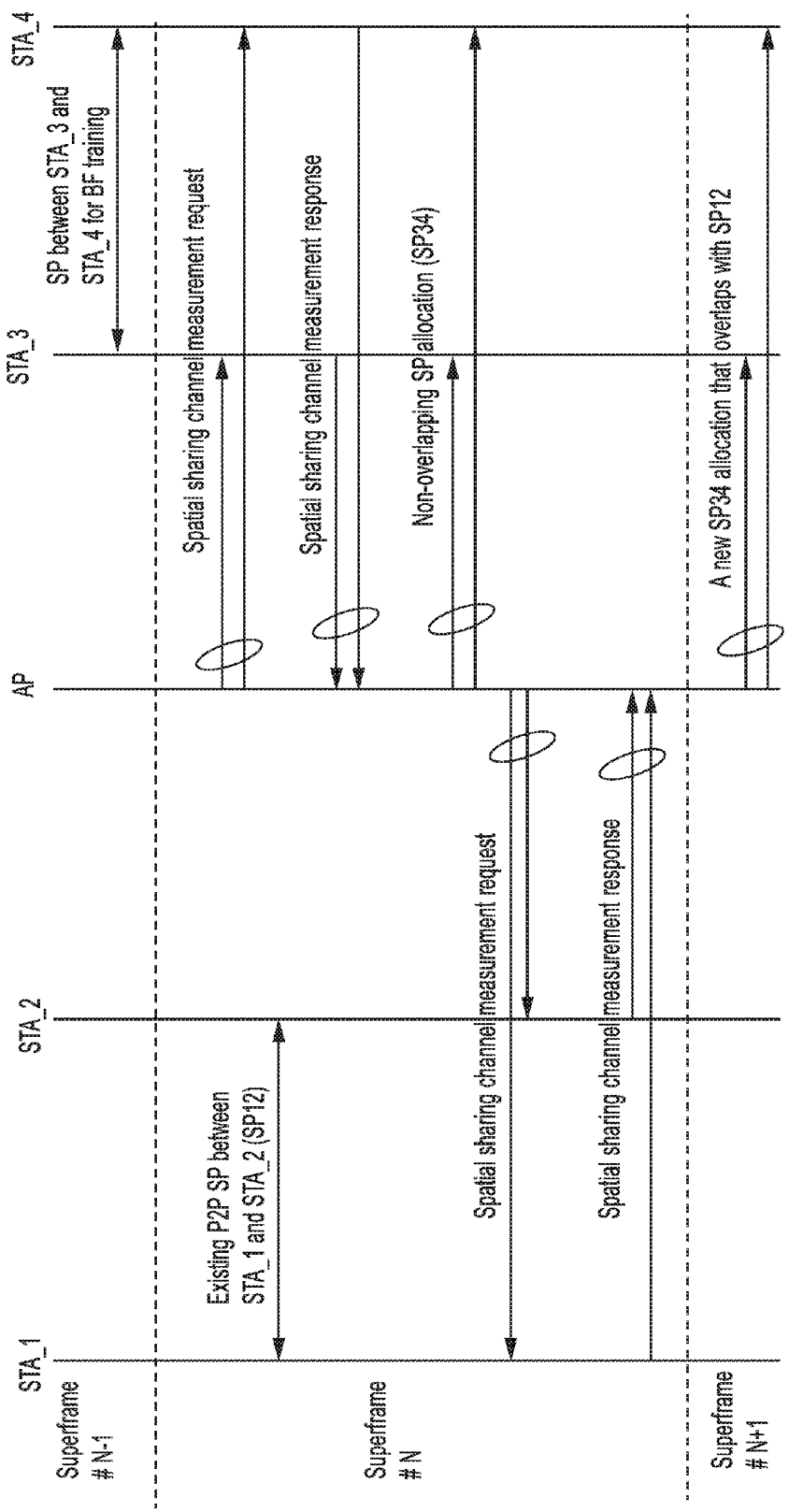
FIG. 10 is a message passing diagram in which centrally controlled spatial sharing is performed under 802.11ad.

FIG. 10 depicts the spatial sharing assessment performed under 802.11ad, with interactions between an AP and four stations seen by the vertical columns, over a period of three superframes as depicted in each of three rows. In a first superframe (N−1) SP is performed between STA 3 and STA 4 for BF training, this is indicative of the last BF training performed between each of the stations. Then in the next superframe (N), one can see an existing peer-to-peer (P2P) communication between STA 1 and STA 2, along with the AP sending spatial sharing measurement requests to STA 3, STA 4, receiving their response, and sending non-overlapping SP allocation (SP34) to STA 3 and STA 4. After which the AP sends spatial sharing measurement requests to STA 1 and STA 2, and receives their responses. In the last superframe shown (N+1) the AP sends out a new SP34 allocation that overlaps with SP12. Thus, after performing the spatial sharing assessment, the P2P link between STA 1 and STA 2 shares the same time and spectrum with the P2P link between STA 3 and STA 4.

With the above background on conventional state of the art 802.11ad mmWave operations, the distinctions of the disclosed apparatus and method should be more readily understood.

2.0 Decentralized Spatial Re-Use.

In this section the disclosed decentralized spatial re-use is described, and how it operates with the broadcast SLS protocol, using a number of example embodiments. Then spatial re-use logic is described in two variants, followed by a description of P2P link establishment.

Figure 11:
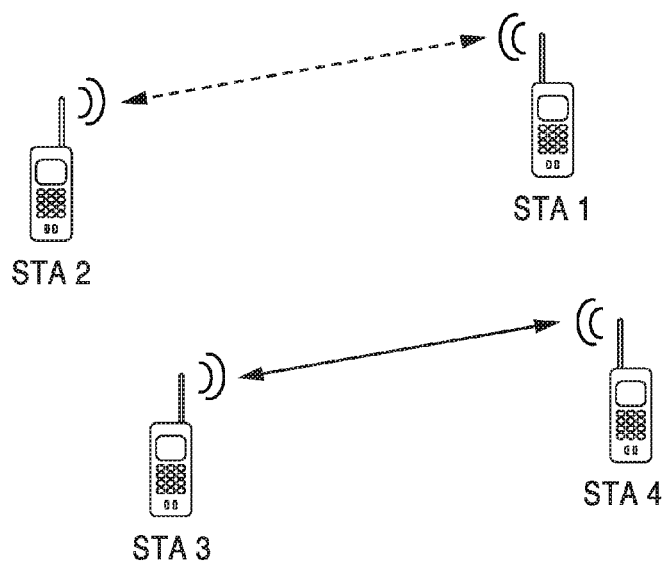
FIG. 11 is a radio node diagram utilized by way of example in discussing embodiments according to the present disclosure.

FIG. 11 depicts an example wireless network in which a group of STAs are in the same spatial vicinity (e.g., a small office). It is desired that pairs of STAs can communicate together simultaneously. By way of example, and not limitation, this discussion is directed to only four STAs. In this example consider the case where STA 3 would like to communicate with STA 4 while STA 1 and STA 2 may simultaneously communicate together. The first enabling mechanism for spatial re-use is a novel broadcast SLS protocol, which allows every STA to at least obtain best sector information for every link in the cluster of STAs engaged in the SLS training.

This best sector information is utilized to perform a decentralized spatial re-use mechanism. For this example STA 3 performs re-use logic that utilizes the best sector info towards STA 4, STA 1, and STA 2 to decide whether or not to initiate communications with STA 4 in a peer-to-peer (P2P) mode without coordination from the AP/PCP. If the re-use decision based on the logic of STA 3 is positive, then STA 3 initiates communication with STA 4 in a directional transmission based on the previous group SLS training. STA 4 processes the request and performs similar re-use logic. If the decision is to process communication with STA 3, then STA 4 acknowledges both the SLS training info and the peer-to-peer request.

Figure 12:
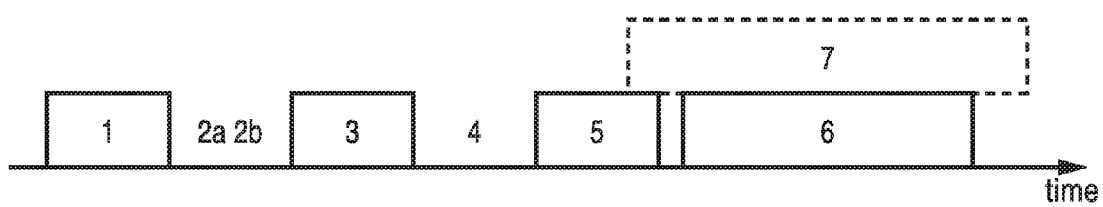
FIG. 12 is an air-time diagram of decentralized spatial re-use according to an embodiment of the present disclosure.

FIG. 12 illustrates a time chart for an example of decentralized spatial re-use. (1) In a first period SLS training is performed. (2) In a first part of a second period (2a) packets arriving at STA 3 require transfer to STA 4, then in a second part (2b) STA 3 executes its disclosed spatial re-use logic. (3) In this period STA 3 transmits a P2P communication request to STA 4. (4) In this period STA 4 runs spatial re-use logic, and in (5) STA 4 acknowledges the P2P request. (6) In this period P2P data transfer occurs between STA 3 and STA 4 takes place. (7) In this period, which can overlap other periods such as periods 5 and 6 as shown, P2P data transfer occurs between STA 1 and STA 2, which may overlap with transmission intended for STA 3 and STA 4 link.

Figure 13:
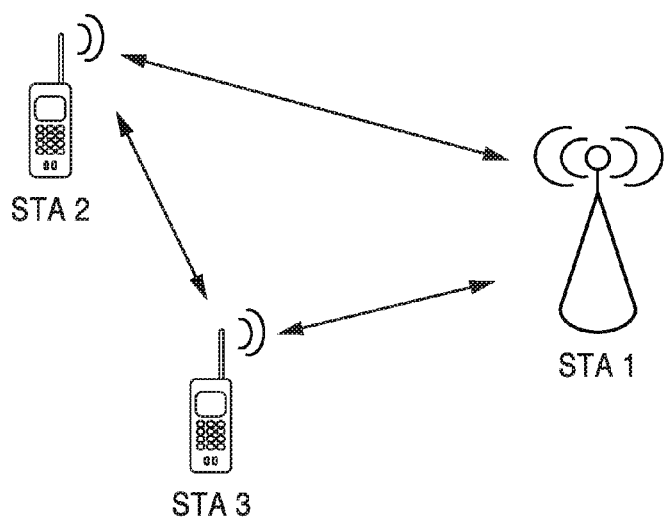
FIG. 13 is a radio node diagram of a wireless network of stations in a given spatial vicinity are using decentralized spatial re-use according to an embodiment of the present disclosure.

FIG. 13 illustrates another example wireless network in which a group of STAs are in the same spatial vicinity (e.g., a small office). In this example figure, three stations are shown including one AP. It will be appreciated, however, that the present disclosure is applicable to networks ranging in the number of stations involved and their configurations. The disclosed group SLS protocol for wireless networks achieves a number of benefits, including the following. (a) Performing coordination of SSW frames and feedback by the initiator STA, while this polling of training signaling does not lead to contention between the STAs to transmit SSW frames. (b) Every STA transmits SSW frames once, this arises at the end of the SLS phase. Every pair of STAs exchanges best sector info. (c) Every STA may be also informed about the best transmit sector for each link within the network of contributing nodes.

2.1 Overview of Broadcast SLS Protocol.

Consider in one embodiment of the disclosed group SLS, where the STAs contributing in the group SLS protocol are within close range. In this case, transmission and reception with quasi-omni mode (no Tx or RX directivity) along with the use of a low rate control PHY can still provide reliable communications. For example a transmission with the following parameters: (i) MCS0 of 802.11ad, (ii) Tx power=17 dBm (for all STAs), and (iii) Max inter-distance between STAs=15 m; leads to an RSSI around −74 dBm which is higher than the MCS0 sensitivity of −78 dbm at 2 GHz of bandwidth.

Figure 14:
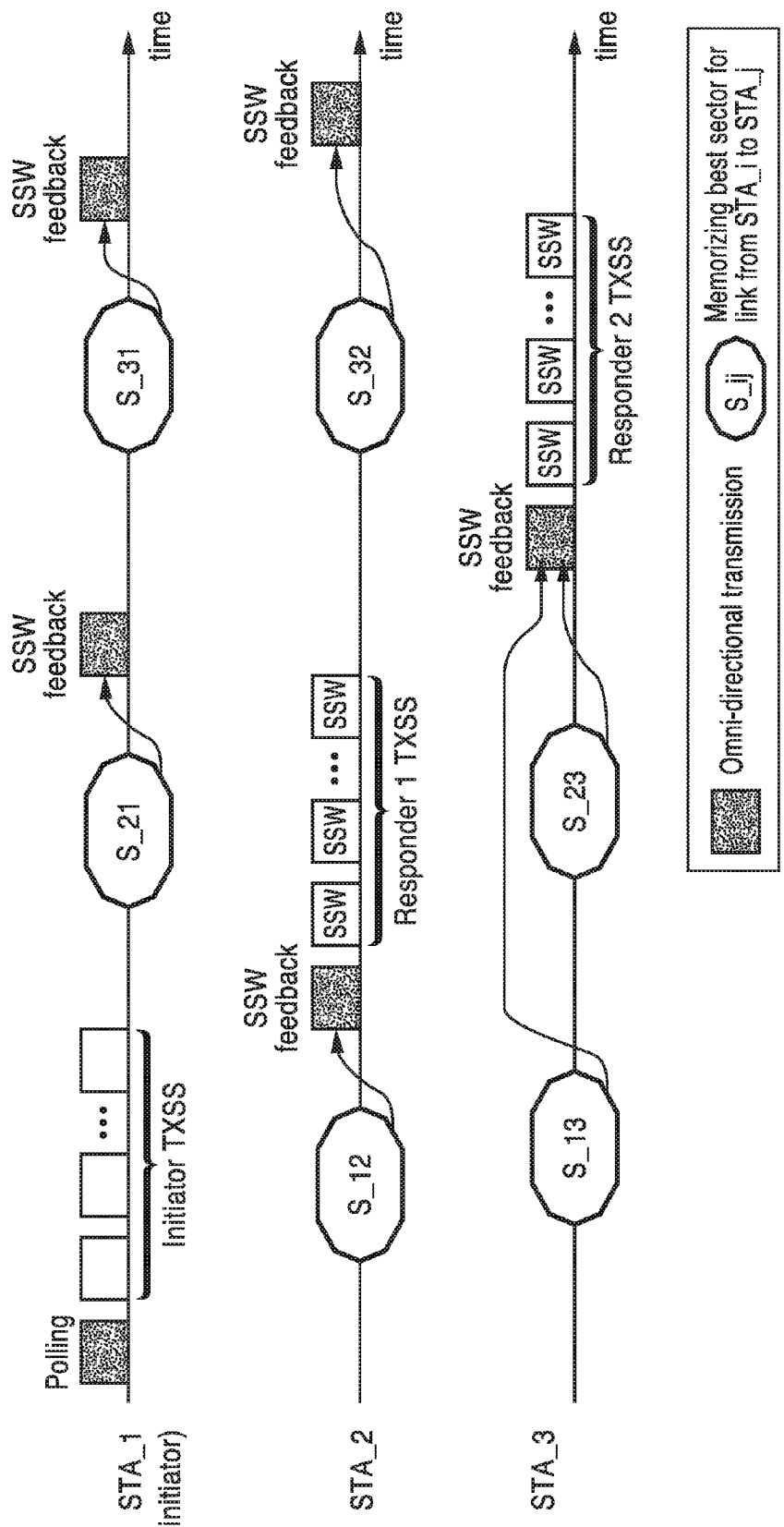
FIG. 14 is a message sequence for the broadcast SLS protocol with immediate SSW feedback according to an embodiment of the present disclosure.

FIG. 14 illustrates an example message sequence using the broadcast SLS protocol with immediate SSW feedback. In this figure communications are shown between the initiator (STA 1) depicted on the top line of the figure, and STA 2 and STA 3 seen in the lower lines of the figure. Polling, using omni-directional transmission, is shown for STA 1 followed by initiator TXSS. This activity is registered by STA 2 and STA 3 in states S_12 and S_13, shown respectively, which memorize (store) the best directional sectors for the specific link. Then STA 2 provides SSW feedback, using omni-directional transmission, followed by generating a first responder TXSS. STA 1 and STA 3 register this activity by STA 2. At or near the end of the first responder TXSS, STA 1 provides SSW feedback to STA 2. After the first responder TXSS, STA 3 provides SSW feedback to STA 2, using omni-directional transmission, then generates a second responder TXSS. This activity is shown registered by STA 1 (state S_31), and STA 2 (state S_32), with the states again storing the best sectors for the respective communications.

Figure 15:
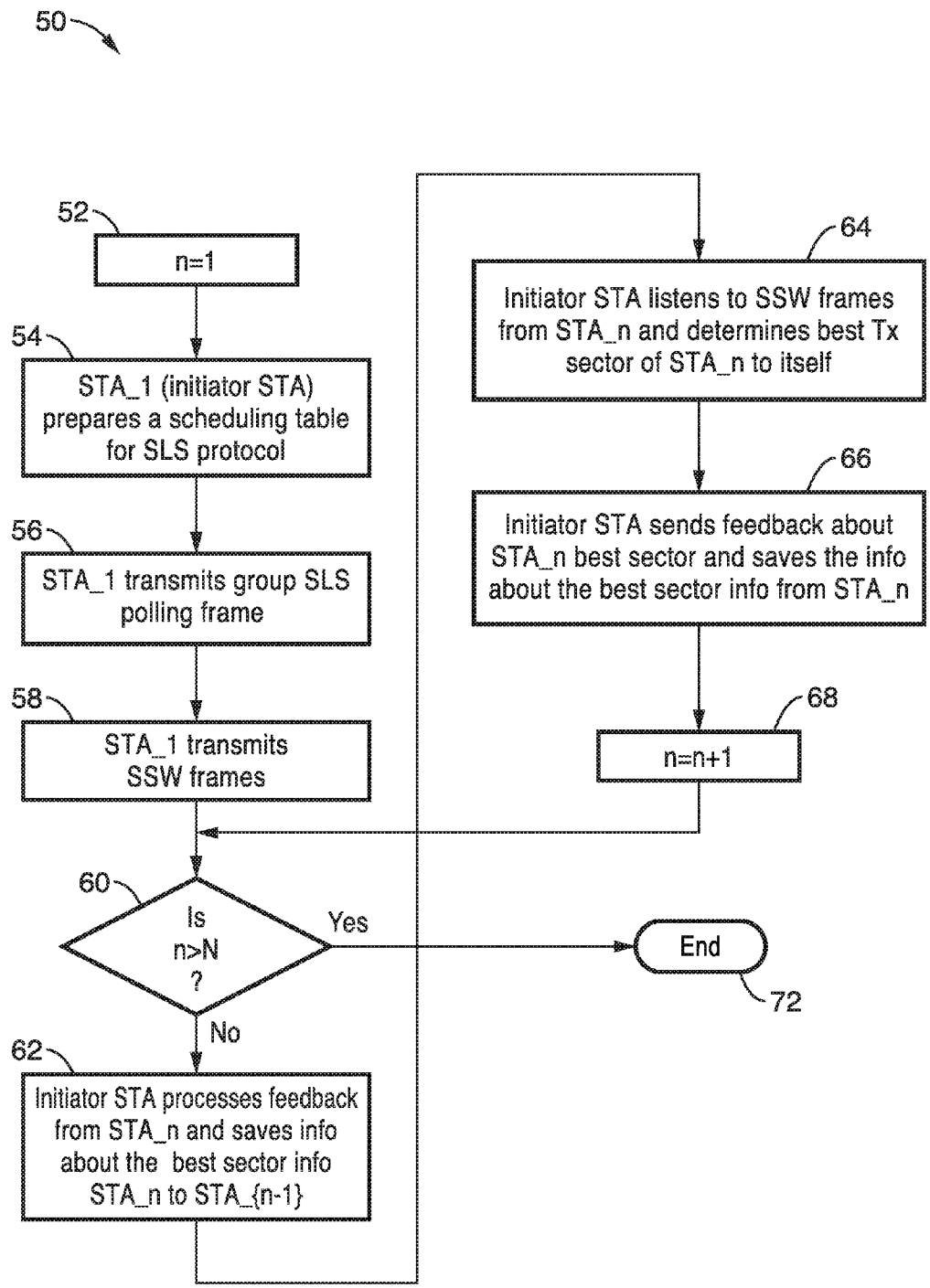
FIG. 15 is a flow diagram for the broadcast SLS protocol with immediate SSW feedback according to an embodiment of the present disclosure.

FIG. 15 illustrates an example flow diagram 50 for the broadcast SLS protocol with immediate SSW feedback according to an embodiment of the present disclosure. A value n, representing the station number, is initiated such as to one (1) at block 52, while the total number of stations in the network (BSS) at the given time is given by the value N. The initiator (e.g., STA 1) prepares 54 a scheduling table for the SLS protocol. STA 1 transmits 56 a group SLS polling frame. STA 1 transmits 58 SSW frames. A decision is made 60 if n is greater than N, to determine if all stations have been processed. If yes, then processing moves to completion (End) 70 for all the stations. If n is still less than or equal to N, then processing continues with block 62, as the initiator processes feedback from STA n, and saves information about best sector information from STA n to STA n−1.

The initiator STA then listens (monitors and receives) 64 to SSW frames from STA n, and determines the best transmit sector of the communication from STA n to itself. Initiator STA sends feedback 66 about STA n best sector and saves information about the best sector from STA n. The value n is incremented 68 for the next pass, with execution returning to block 60, until n becomes greater than N. It will be appreciated that one of ordinary skill in the art can modify the flow diagram in a number of ways without departing from the present disclosure which performs the described processing for each of the stations.

FIG. 16A is an SLS beamforming polling frame, having the following fields. The Frame Control field contains information about the type of frame, power management information, retried frame, and so forth. The Duration field indicates the duration of the frame in microseconds. The RA field is a MAC address that identifies the intended recipient STA(s), and in this instance RA is set to a broadcast group address. The TA field is a MAC transmitter address that identifies the STA that has transmitted this frame. The SLS-P IE field is the SLS polling information element, as described in a previous section. The FCS field is a frame check sequence that validates the reception of the frame contents.

FIG. 16B is the data format of an example SLS polling (SLS-P) Information Element (IE) having the following fields. The IE ID subfield is a number of bits interpreted by the STAs as the SLS polling announcement IE. The Length subfield indicates the length in bytes of the IE. The STA IDs is an ordered list of STA IDs to be engaged in the group SLS training. Timing offsets are an ordered list of time offsets for either SSW transmission or SSW feedback. The Usage bit indicates either SSW or SSW feedback.

FIG. 16C illustrates an example of a broadcast SLS SSW frame format. The SLS SSW feedback frame format includes the following fields. The Frame Control field contains information about the type of the frame, power management information, retried frame, and so forth. The Duration frame indicates duration of the frame in microseconds. The RA frame is a MAC address that identifies the intended recipient STA(s), and is set to broadcast or multicast. The TA field is a MAC address that identifies the STA that transmits the frame. The SSW field was described in FIG. 7. The FCS field is a frame check sequence that validates the reception of the frame contents. In this embodiment the SSW feedback is decoupled from the SSW frames.

FIG. 17 illustrates an example format for a broadcast SLS SSW feedback frame. The Frame Control field contains information about the type of frame, power management information, retried frame, and so forth. The Duration field indicates the duration of the frame in microseconds. The RA field is a MAC address that identifies intended recipient STA(s), set to broadcast or multicast. The TA field is a MAC address that identifies the STA that transmits the frame. The SSW Feedback field contains multiple fields, with one field for each STA in the local network, for example from 1 . . . N fields, where N is the number of STAs. The FCS field is a frame check sequence that validates the reception of the frame contents.

FIG. 18 illustrates example fields within one of the SSW feedback fields seen in FIG. 17, and contains the following fields. The STA ID subfield represents which neighbor STA the SSW Feedback is intended for. The Sector Select subfield is the value of the Sector ID subfield of the SSW field within the frame that was received with best quality in the immediately preceding sector sweep from STA 1. Antenna Select subfield is the value of the DMG Antenna ID subfield of the SSW field within the frame that was received with best quality in the immediately preceding sector sweep from STA 1. The SNR Report subfield is the value of the SNR from the frame that was received with best quality during the preceding SSW.

Figure 19:
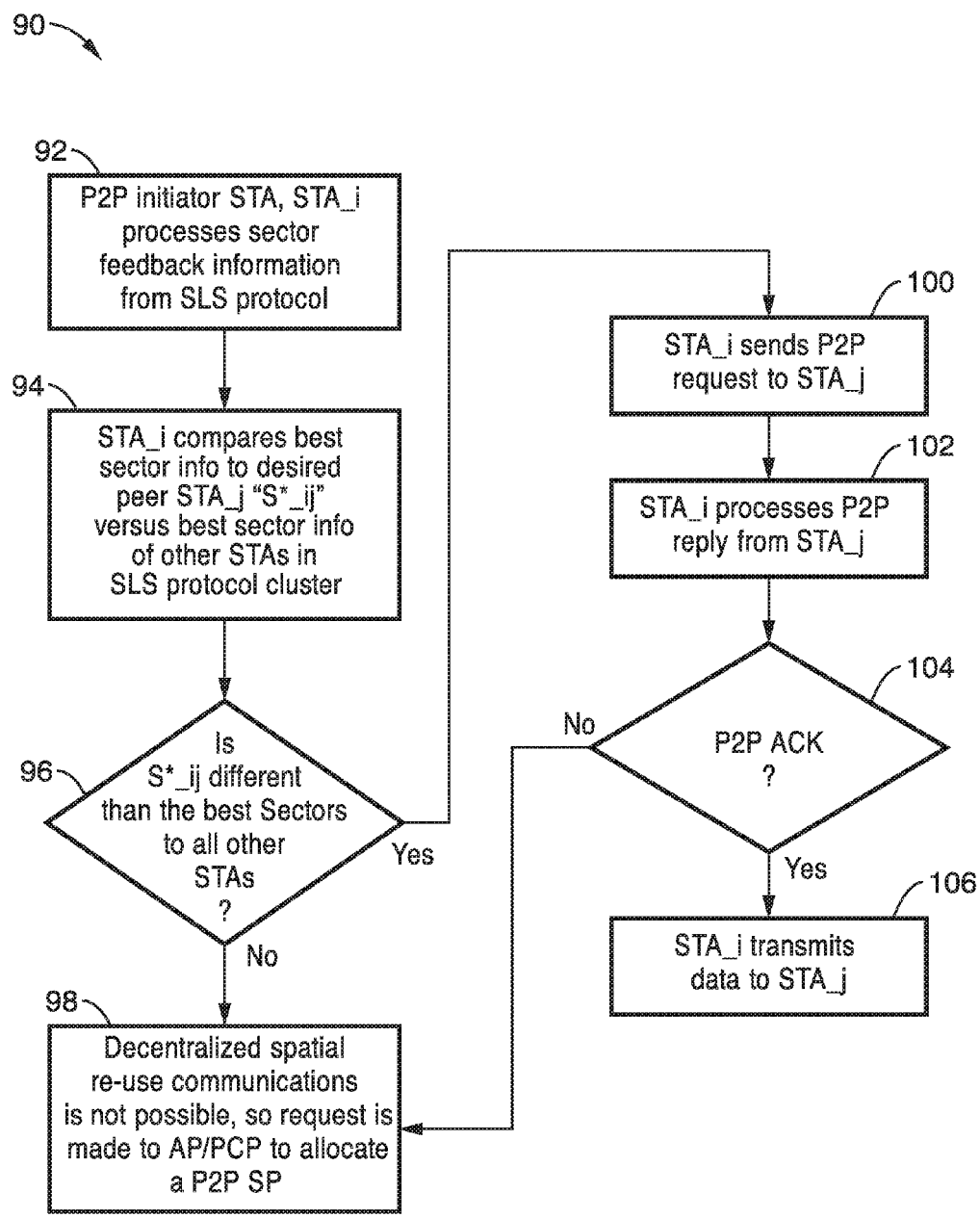
FIG. 19 is a flow diagram of spatial re-use for P2P communications on an initiator station according to an embodiment of the present disclosure.

FIG. 19 illustrates an example embodiment 90 of spatial re-use logic for P2P communications on initiator stations. In block 92 the P2P initiator station (STA) STA_i processes sector feedback information from the SLS protocol. Then STA_i compares 94 best sector information to the desired STA_j "S*_ij" versus best sector information of other STAs in the SLS protocol cluster. If it is determined in block 96 that S*_ij is not different from the best sectors to all others STAs, then block 98 is performed, as decentralized spatial re-use communications is not possible (as this sector may be utilized in other communications), so a request is made to the AP/PCP for allocating a P2P SP. Otherwise decentralized re-use is possible and execution moves from block 96 to block 100 in which STA_i sends a P2P request to STA_j, then STA_i processes 102 the P2P reply from STA_j, checking for an ACK. If determined in block 104 that there is no ACK received, then execution moves to block 98 as decentralized spatial re-use does not appear possible, and a request is made to the AP/PCP for allocating a P2P SP. Otherwise, if it is determined in block 104 that the ACK is received, then execution moves to block 106 with STA_i transmitting data to STA_j.

Figures 20, 21:
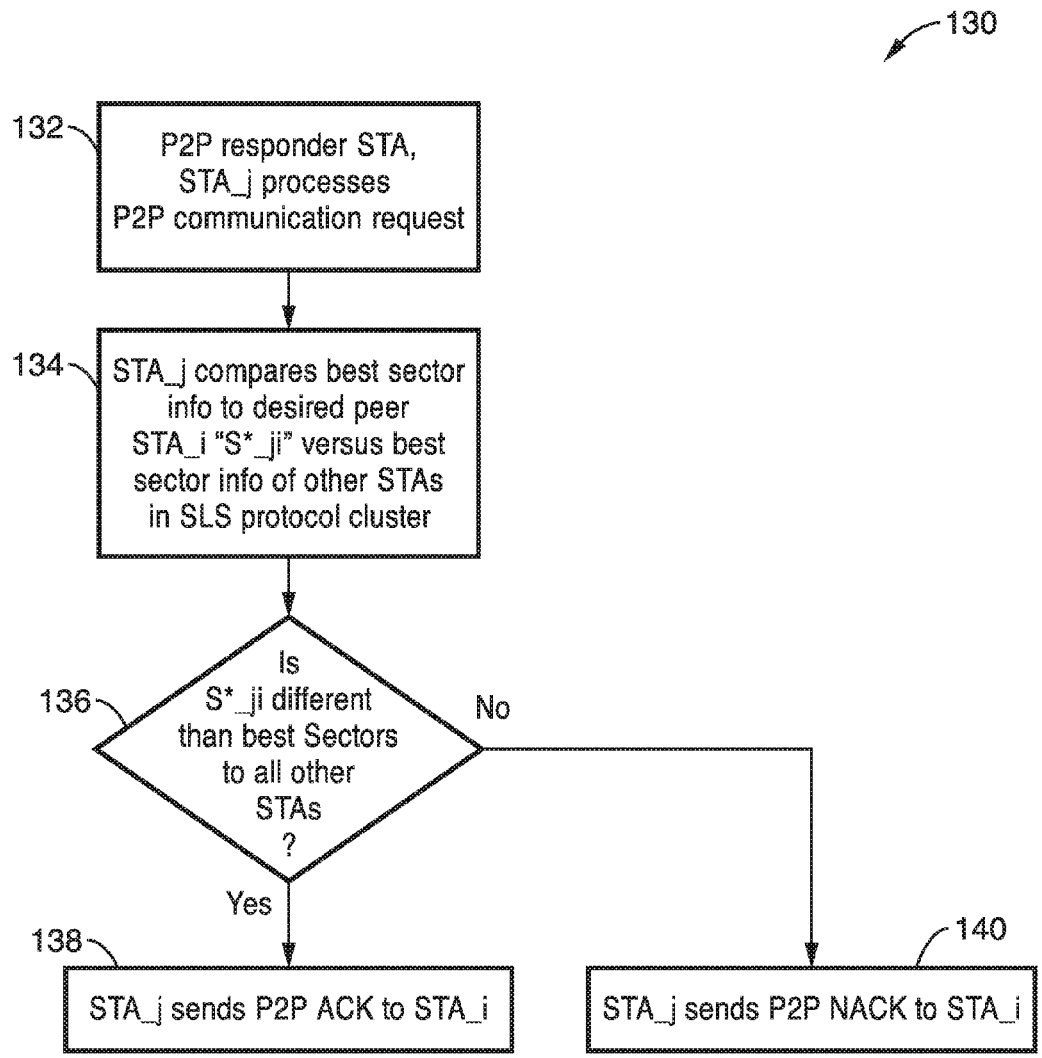
FIG. 20 is a flow diagram of spatial re-use for P2P communications on a responder station according to an embodiment of the present disclosure.
FIG. 21 is a data format for an SSW feedback field according to an embodiment of the present disclosure.

FIG. 20 illustrates an example embodiment 130 of spatial re-use logic for P2P communications on a responder station. In block 132 a P2P responder station (STA_j) processes a P2P communications request (e.g., from STA_i). STA_j compares 134 best sector information to the desired peer STA_i "S*_ji" versus best sector information of other STAs in the SLS protocol cluster. A determination is made in block 136 if S*_ji is different than best sectors to all other STAs. If it is different, then block 138 is executed in which STA_j sends a P2P ACK to station STA_i. Otherwise, if S*_ji is not different, then block 140 is executed and STA_j sends a P2P NACK (Negative ACK) to STA_i.

The logic above for determining whether P2P communications is possible depends only on best sector information.

However, in certain circumstances, this logic can still cause some interference from the desired P2P link to other links if the best sector of the P2P link is spatially highly correlated with best sectors with other links. So another example embodiment is described for decentralized spatial re-use, which modifies the SSW Feedback Field for every STA to include not only best sector information, but least "n" sector information as well. In this discussion it is assumed that n=3 for illustration purposes only, where in actuality "n" can take on any value depending on the trade-off between messaging overhead and probability of establishing a P2P link versus decentralized spatial re-use protocol simplicity. The least sector info allows the P2P initiator and responder STAs to determine P2P communications validity if the best sectors of the P2P link falls in the neighbor STAs set of least sectors.

It should also be noted that in an alternative embodiment of reporting a best sector, multiple best sectors "m" can be reported, preferably including signal-to-noise information for each of these "m" best sectors. Thus, any of the "m" sectors can be picked to communicate with a peer STA, such as one that satisfies being in the set of "n" least sectors to other STAs. This previous discussions, however, assumed m=1 for brevity of the presentation.

FIG. 21 illustrates a SSW feedback field as modified for the purposes described above, and which contains the following fields. The STA ID subfield represents which neighbor STA the SSW Feedback is intended for. The Best Sector subfield is a value of the Sector ID subfield of the SSW field within the frame that was received with best quality in the immediately preceding sector sweep from STA 1. The Best Antenna subfield is a value of the DMG Antenna ID subfield of the SSW field within the frame that was received with best quality in the immediately preceding sector sweep from STA 1. The Best SNR Report subfield is a value of the SNR from the frame that was received with best quality during the immediately preceding sector sweep, and which is indicated in the sector select field. The nth Least Sector subfield is a value of the Sector ID subfield of the SSW field within the frame that was received with the nth worst quality (n=1, is the least quality, n=2 is the second least quality, and so on) in the immediately preceding sector sweep from STA 1. The nth Least Antenna subfield is a value of the DMG Antenna ID subfield of the SSW field within the frame that was received with the nth worst quality in the immediately preceding sector sweep from STA 1. The nth Least SNR Report subfield is a value of the SNR from the frame that was received with the nth worst quality during the immediately preceding sector sweep, and which is indicated in the sector select field.

Figure 22:
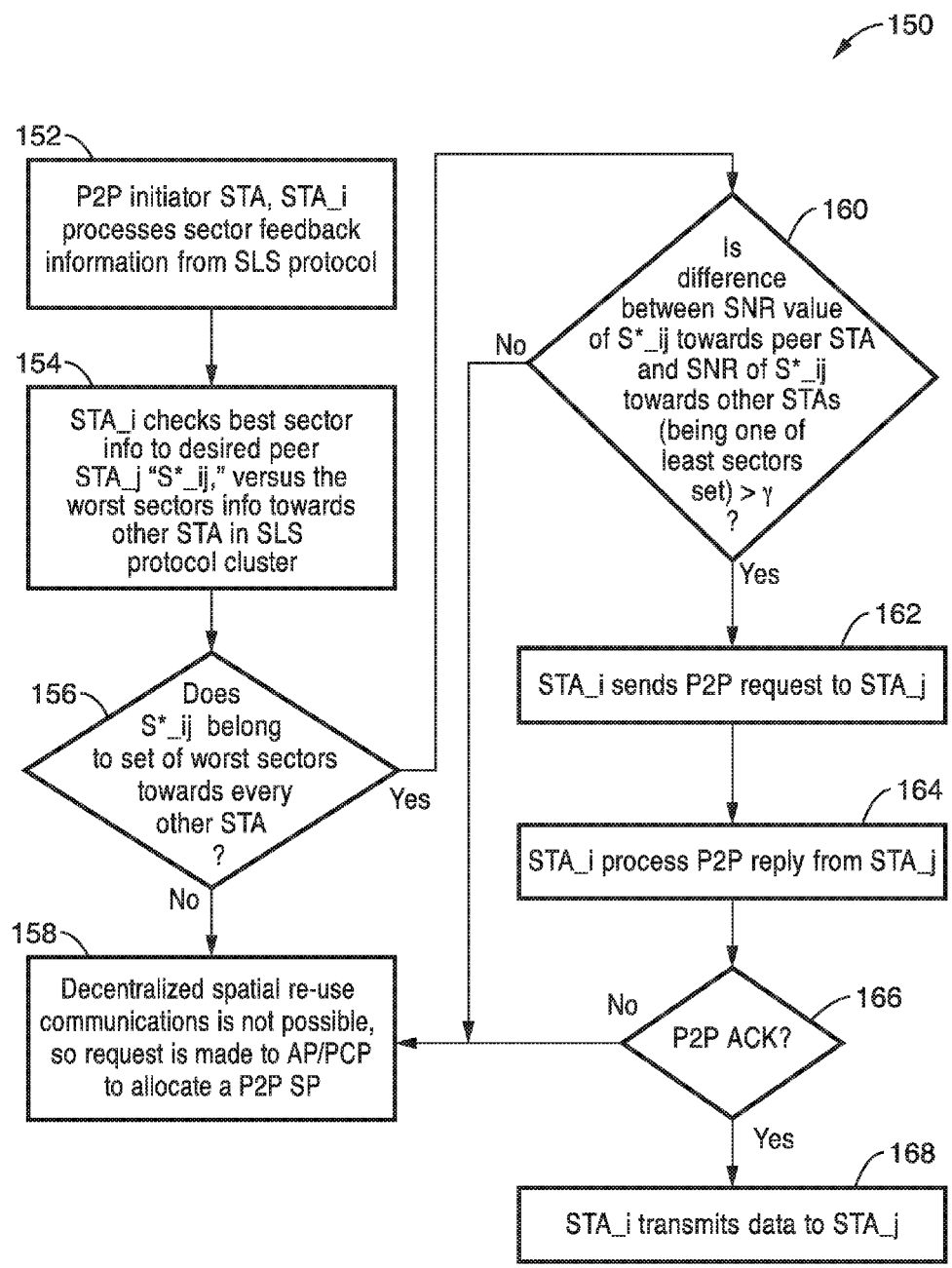
FIG. 22 is a flow diagram of spatial re-use for P2P communications by an initiator station according to another embodiment of the present disclosure.

FIG. 22 illustrates an example embodiment 150 of modified spatial re-use logic for P2P communications at an initiator STA. In block 152 the P2P initiator, STA_i, processes sector feedback information from the SLS protocol, and checks 154 best sector information to desired peer STA_J "S*_ij", versus the worst sector's information toward other STAs in the SLS protocol cluster. A determination is made in block 156 does S*_ij belong to the set of worst sectors toward every other STA. If it does not belong to the worst sectors, then block 158 is executed as decentralized re-use communications is not possible, and a request is made to the AP/PCP to allocate a P2P SP. Otherwise, if it does belong to the worst sectors then execution moves from block 156 to block 160 where a determination is made if the SNR value of S*_ij towards peer STA, and the SNR of S*_ij towards other STAs, is greater than an interference threshold value γ. It should be appreciated that use of Signal-to-Noise Ratio (SNR) for determining this threshold γ is merely a design choice, as other interference threshold metrics may be similarly utilized. It will be noted that γ=23 dB should allow operation of links at the highest possible single carrier modulation in the 802.11ad specification.

If the difference found in block 160 is not greater than interference threshold γ, then the decentralized spatial re-use is not possible and execution moves to block 158. Otherwise, since the signal levels exceed the interference threshold, block 162 is executed where STA_i sends P2P request to the STA_j, and then processes 164 the P2P reply from STA_j. In block 166 the reply from STA_j is processed, in which if a proper P2P ACK is received then block 168 is executed with STA_i transmitting data to STA_j, otherwise without the ACK (or receiving a NACK) then execution is routed to block 158 as the spatial re-use is not possible.

Figure 23:
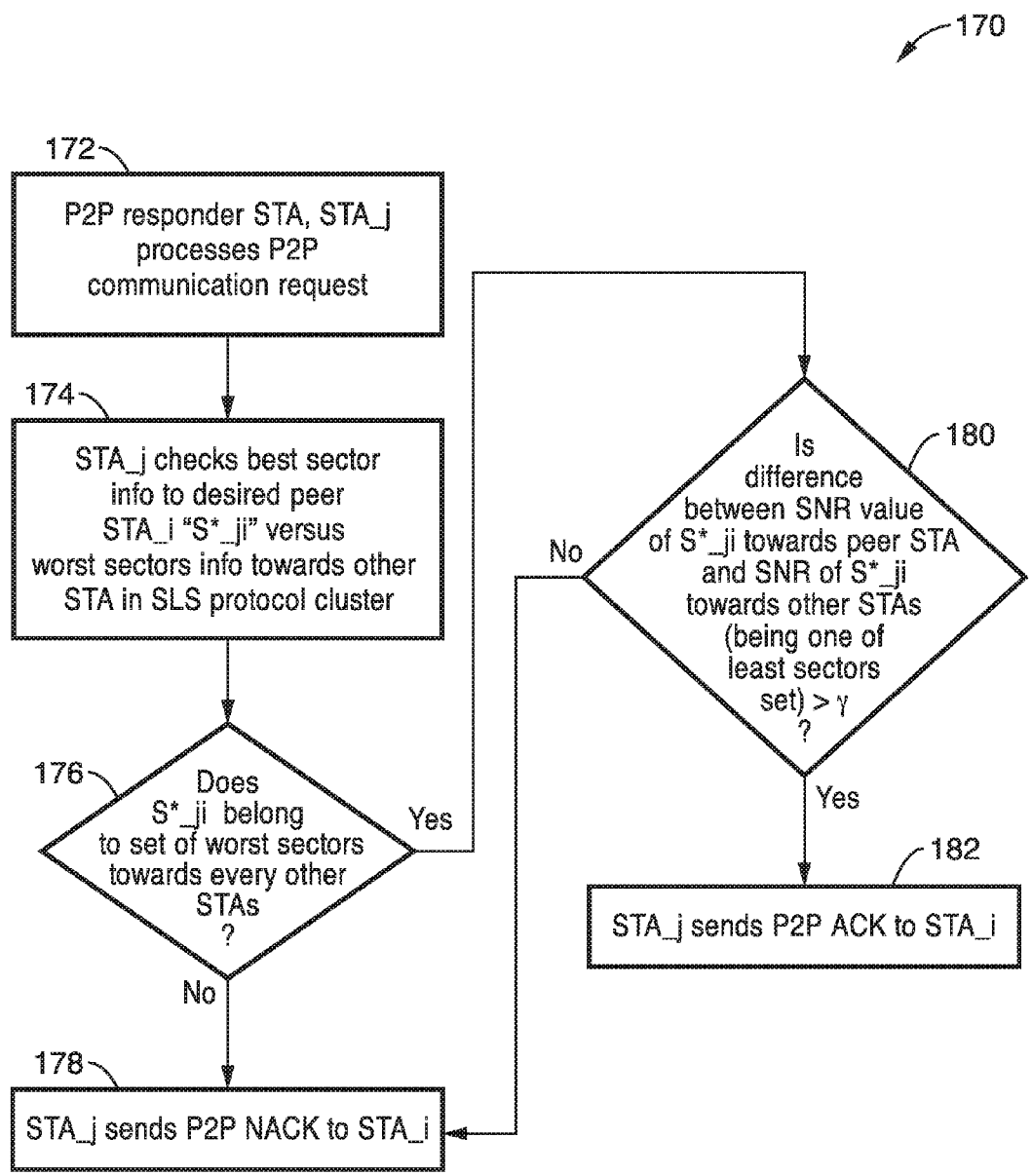
FIG. 23 is a flow diagram of spatial re-use for P2P communications by a responder station according to another embodiment of the present disclosure.

FIG. 23 illustrates an example embodiment 170 of modified spatial re-use logic for P2P communications for the responder STA. In block 172 a P2P response station (STA_j) processes a P2P communications request, and checks 174 best sector information to desired peer STA_i "S*_ij" with response to worst sector info toward this other STA in the SLS protocol cluster. A determination is made in block 176 if S*_ij belongs to the set of worst sectors toward every other STA. If NOT, then block 178 is executed in which STA_j sends a P2P NACK to STA_i, thus declining the direct P2P communication. Otherwise, if S*_ij belongs to the set of worst sectors toward every other STA, then block 180 is executed and a determination is made of the difference between SNR value of S*_ij toward peer STA, and S*_ij towards other STAs, being above an interference threshold γ. If the signal level is greater than the interference threshold, then in block 182 STA_j sends a P2P ACK to STA_i. Otherwise, the signal is not above this thresholds, wherein block 178 is executed with STA_j sending a NACK to decline the decentralized P2P communications.

2.2 Overview of ACK and Beam Forming Training.

The group SLS training protocol in general allows an STA to mutually learn best sector information towards all other STAs in its vicinity. The SLS P2P initiator STA, after running re-use logic, sends the P2P request to the peer STA in a directional manner. It uses the best sector information learned from the last accomplished SLS phase protocol. The P2P responder STA, as part of acknowledging the P2P response, also acknowledges the SLS BF to be effective and/or requests SLS RXSS. The P2P initiator STA processes the acknowledgment and either transmits data with same SLS sector or initiates a new SLS training phase with its peer only.

FIG. 24 illustrates a P2P request frame format having the following fields. The Frame Control field contains information about the type of the frame, power management information, retried frame, and so forth. The Duration field indicates duration of the frame in microseconds. The RA field is a MAC address of the peer STA, P2P responder STA. The TA field is a MAC transmitter address that identifies the STA that has transmitted this frame, the P2P initiator STA. The Allocation field provides information about P2P data allocations, as described for the next figure. The initiator P2P STA can allocate some time to itself as well as for the peer STA to exchange data. The Extendible bit is set to one (1) to indicate that P2P initiator STA permits extension of allocations, if requested by P2P responder STA. The FCS is a frame check sequence that validates the reception of the frame contents.

FIG. 25 illustrates a P2P allocation information field, whose subfields are described as follows. Source AID: Association identifier (AID) of the STA that gains the P2P channel access during the current allocation. A Destination AID subfield indicates the AID for the STA that will be receiving the data during the current allocation. The Start time is a time offset that determines the start of the current allocation. The Allocation Duration subfield indicates the duration of the current allocation in microseconds.

FIG. 26 illustrates an example embodiment of a P2P ACK frame format having the following subfields. The Frame Control subfield contains information about the type of the frame, power management information, retried frame, and so forth. The Duration subfield indicates the duration of the frame in microseconds. The RA subfield is a MAC address of the peer STA, P2P initiator STA. The TA subfield is a MAC address that identifies the STA that has transmitted this frame, the P2P responder STA. The P2P ACK is a bit that acknowledges P2P request, for instance with a value of one (1) indicating that the P2P request is accepted. The Allocation ACK is a bit indicating if the allocation of the P2P initiator STA is accepted (e.g., 1=accepted). The Extended Allocation start time is valid only if Allocation ACK equal to 0, and the Extendible bit of the P2P request frame is equal to 1; this matches the Allocation 2 info field start time of the P2P request frame. The Allocation Duration subfield is the new allocation duration requested by the P2P responder STA. The Extendible bit indicates whether the P2P responder STA permits extension of allocations, if requested by P2P initiator STA, for example a value of one (1) indicates the extensions are allowed. The BF Control Field contains information about the beamforming training needed, as described in the next figure. The FCS subfields is a frame check sequence that validates the reception of the frame contents.

FIG. 27 is a P2P BF training field within the ACK frame and it contains the following subfields. The BF Training subfield indicates if further training is necessary, and in this example is set to one (1) to indicate that more training is needed, otherwise previous SLS training is indicated to be sufficient. The "IsInitiatorTXSS" subfield is set to 1 to indicate that the P2P initiator STA starts the beamforming training with a new initiator TXSS; otherwise RXSS only may be needed. The "IsRXSS" subfield indicates whether the P2P initiator STA performs initiator RXSS; for example this is set to one (1) to indicate that P2P STA performs the initiator RXSS. The RXSS Length subfield is valid only if IsRXSS indicates that the P2P STA performs the initiator RXSS. The value represented by the RXSS Length subfield specifies the total number of receive sectors combined over all receive antennas of the P2P responder STA.

Figure 28:
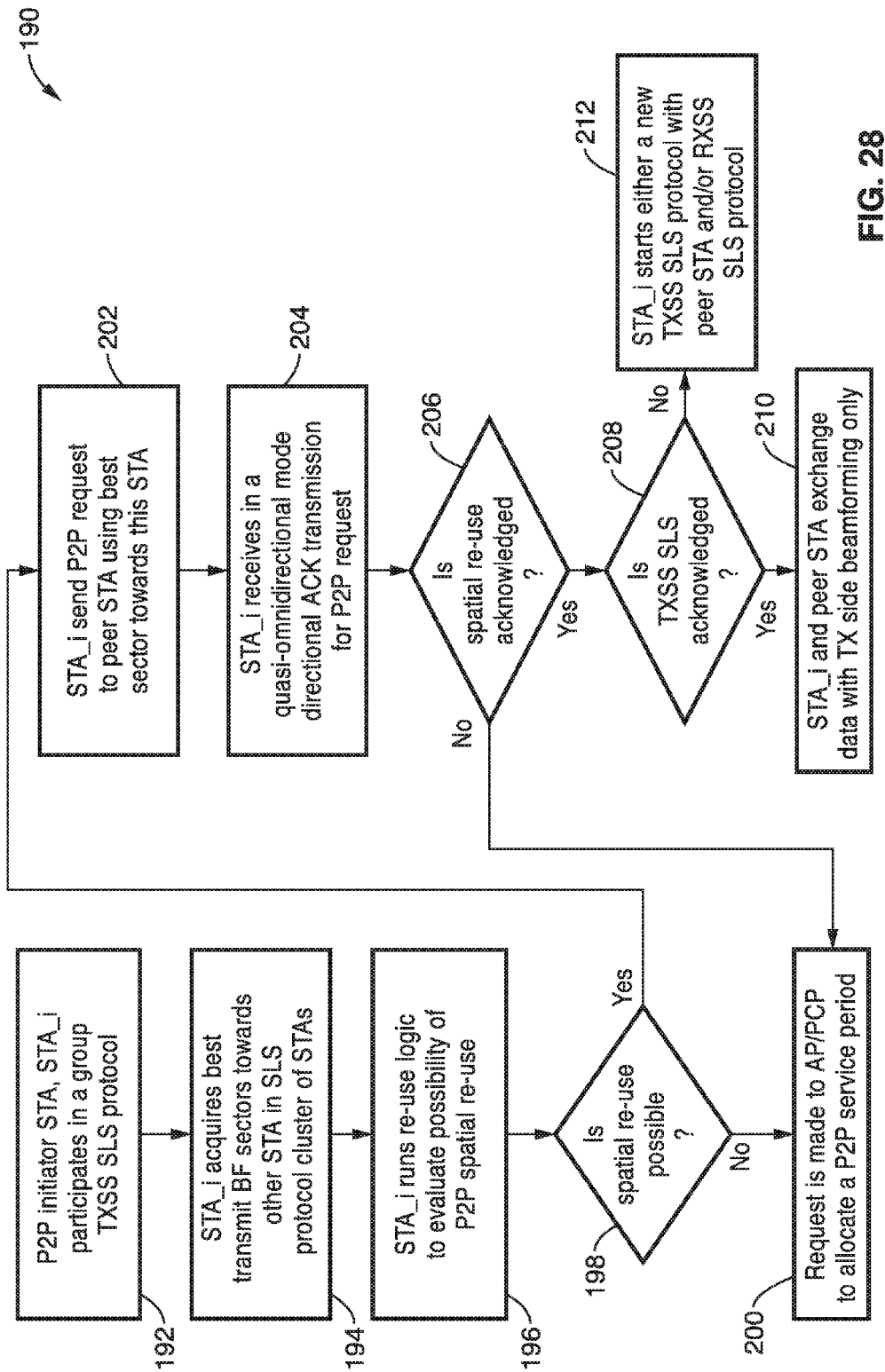
FIG. 28 is a flow diagram for P2P initiator BF training according to an embodiment of the present disclosure.

FIG. 28 illustrates an embodiment 190 of P2P initiator BF training logic. In block 192 the P2P initiator STA, STA_i, participates in a group TXSS SLS protocol, and so acquires 194 best transmit BF sectors towards other STAs. The initiator station STA_i runs 196 re-use logic to evaluate the whether P2P spatial re-use can be performed, which is determined in block 198. If spatial re-use is not possible, then execution moves to block 200 with a request being made to the AP/PCP to allocate a P2P service period. However, if spatial re-use is possible, then execution moves to block 202 with STA_i sending a P2P request to peer STA using the best sector toward this STA, and then receives 204 in a quasi-omnidirectional mode a directional ACK transmission for the P2P request. This response is then evaluated in block 206, and if spatial re-use is not acknowledged, then execution moves to block 200 with a request being made to the AP/PCP to allocate a P2P service period. Otherwise, if spatial re-use is allowed, then a check is made in block 208 if the TXSS SLS has been acknowledged. If the TXSS SLS has been acknowledged, then block 210 is executed and STA_i and the peer exchange data using TX side beamforming only. However, if TXSS SLS is not acknowledged, then in block 212 STA_i starts either a new TXSS SLS protocol with peer STA, and/or performs an RXSS with the SLS protocol.

Figure 29A:
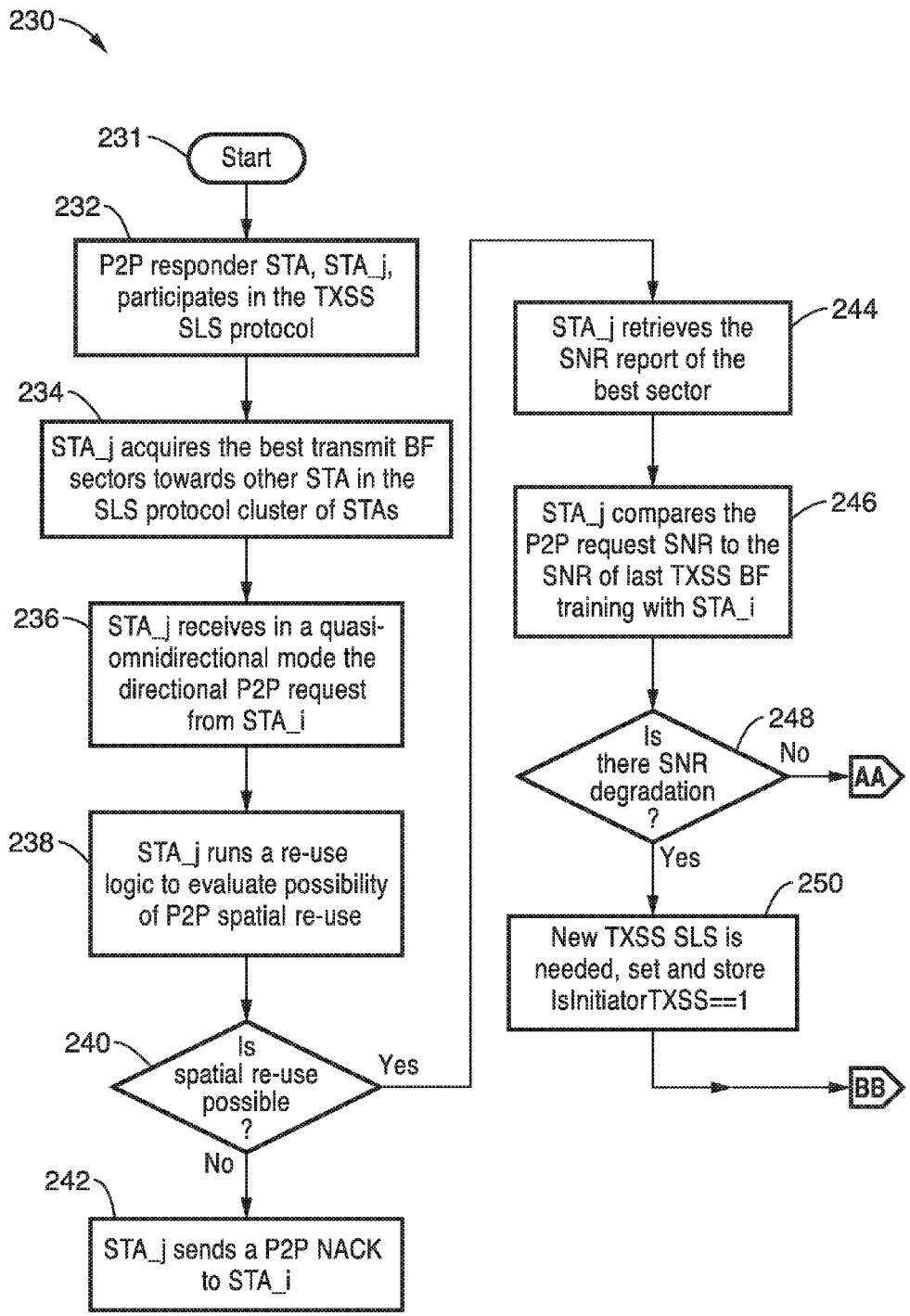
FIG. 29A and FIG. 29B is a flow diagram for P2P responder BF training according to an embodiment of the present disclosure.
Figure 29B:
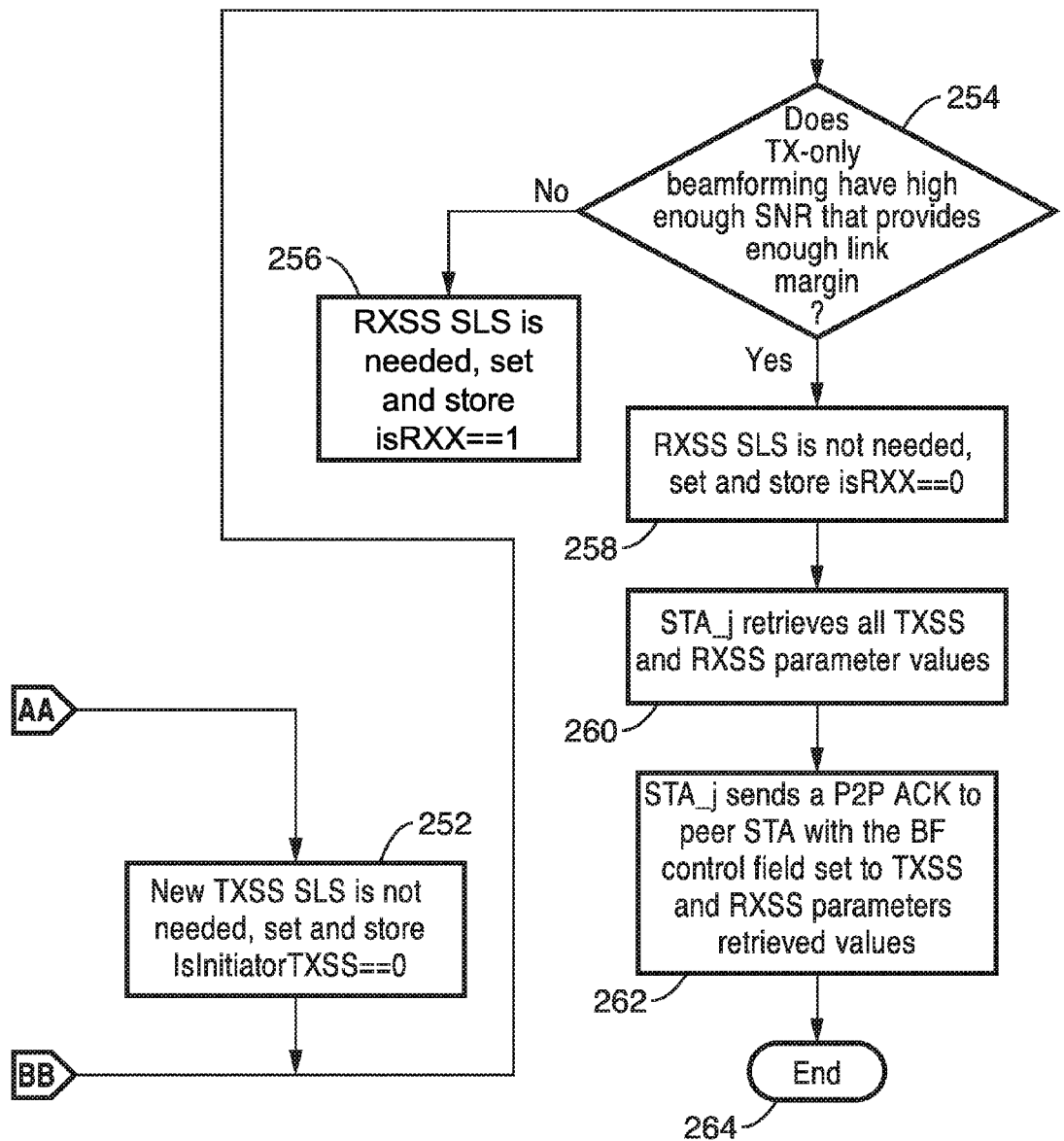

FIG. 29A and FIG. 29B illustrate an embodiment 230 of P2P responder BF training logic. The logic starts 231 in FIG. 29A and in block 232 the P2P responder STA, STA_j, participates in the TXSS SLS protocol, and so acquires 234 best transmit BF sectors towards other STAs. The responder station STA_j receives 236 in a quasi-omnidirectional mode a directional P2P request from initiator station STA_i. Then responder STA_j executes re-use logic to evaluate whether P2P spatial re-use can be performed, which is determined in block 240. If spatial re-use is not possible, then execution moves to block 242 with a P2P NACK (Negative ACKnowledge) being returned to STA_i. Otherwise, if spatial re-use is possible, then execution moves from block 240 to block 244 in which STA_j retrieves the SNR report of best sector and the P2P request SNR to SNR of TXSS with STA_i. STA_j compares 246 the P2P request SNR to the SNR of last TXSS BF training with STA_i.

A decision is made 248 on whether there is SNR degradation. If SNR degradation above a threshold level is found, then a new TXSS SLS is needed, so a flag is set (e.g., "IsInitiatorTXSS"==1), and execution moves to FIG. 29B block 254. Otherwise, since there was no significant SNR degradation determined in block 248, a new TXSS SLS is not needed, and execution moves into FIG. 29B with the flag being reset 252 ("IsInitiatorTXSS"==0). Reaching block 254 a decision is made if TX-only beamforming has enough signal-to-noise ratio (SNR) to provide a sufficient link margin. If it does not, then block 256 is executed with an RXSS flag being set (e.g., "isRXSS==1) to indicate RXSS SLS is to be performed, and this routine ends. If there is sufficient SNR then execution moves from block 254 to block 258, and since RXSS SLS is not needed the isRXSS flag is reset ("isRXSS"==0). Reaching block 260 STA_j retrieves all TXSS and RXSS parameter values, and sends 262 a P2P ACK to peer STA with the BF control field set TXSS and RXSS values, and this processing ends 264.

The enhancements described in the presented technology can be readily implemented within various wireless radio networking nodes (e.g., APs and STAs). It should also be appreciated that each of these wireless radio nodes are preferably implemented to include at least one computer processor device (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with networked radio communication. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A directional wireless radio communication apparatus providing decentralized spatial sharing between multiple wireless radio communication devices, comprising: (a) a transmitter configured for generating beamformed directional radio transmissions to other wireless radio communication devices which are in range; (b) a receiver configured for receiving radio transmissions from stations comprising wireless radio communication devices; (c) a computer processor coupled to said transmitter and said receiver for controlling communications between itself and other stations; (d) a non-transitory computer-readable memory storing instructions executable by the computer processor; (e) wherein said instructions, when executed by the computer processor, which allow multiple pairs of peer-to-peer (P2P) stations to communicate simultaneously over a channel in a spatial vicinity without centralized control, having steps comprising: (e)(i) performing a beamforming training between stations in which every station acquires best sector information for transmitting towards other stations; (e)(ii) performing spatial re-use at each station independently for initiating peer-to-peer (P2P) communication with other stations and responding to peer-to-peer requests from other stations; (e)(iii)(a) initiating P2P communications to a target station by using best beamforming sector information determined from beamforming training to: (e)(iii)(a)(1) determining that best sector for transmitting to that target station is different than best sectors for communicating with all other stations; (e)(iii)(a)(2) sending a P2P request to that target station, and (e)(iii)(a)(3) responding to an acknowledgement from that target station by transmitting P2P data to that target station; or (e)(iii)(b) responding to a P2P request from another station by using best beamforming sector information determined from beamforming training for: (e)(iii)(b)(1) determining that best sector to the initiating station is different than best sector for all other stations; (e)(iii)(b)(2) responding with an acknowledgement to said P2P request; (e)(iii)(b)(3) receiving P2P data from said initiator station; and (e)(iv) wherein said P2P communications are performed between peer stations without contention and without centralized control of the communication.

2. The apparatus of any preceding embodiment, wherein said beamforming training between stations further includes obtaining signal-to-noise level information for said best transmit sector information towards other stations so that signal-to-noise value for a link towards a peer station is checked to assure it exceeds a desired interference threshold.

3. The apparatus of any preceding embodiment, wherein said beamforming training between stations further includes every station acquiring least sector information.

4. The apparatus of any preceding embodiment, wherein said least sector information comprises information about least "n" sectors, from which P2P initiator and responder stations determine P2P communications validity if the best sectors of a P2P link falls in the neighbor stations set of least sectors.

5. The apparatus of any preceding embodiment, wherein said beamforming training between stations further includes signal-to-noise level information for said least sector information.

6. The apparatus of any preceding embodiment, wherein said P2P request contains field information comprising: (a) information about type of frame; (b) duration of the frame; (c) MAC address of the peer station and transmitting station.

7. The apparatus of any preceding embodiment, wherein said P2P request further comprises (a) information about P2P data allocations; and (b) extension flag to allow extending data allocation.

8. The apparatus of any preceding embodiment, wherein said P2P request further comprises a frame check sequence configured for validating reception of said P2P request.

9. The apparatus of any preceding embodiment, wherein said acknowledgement to said P2P request contains field information comprising: (a) information about type of frame; (b) frame duration; (c) MAC addresses of peer station and station transmitting acknowledgement; (d) ACK field indicating P2P request is accepted.

10. The apparatus of any preceding embodiment, wherein said P2P acknowledgement further comprises (a) information about P2P data allocations; and (b) extension flag to indicate if responder allows extending data allocation.

11. The apparatus of any preceding embodiment, wherein said P2P acknowledgement further comprises a frame check sequence configured for validating reception of said P2P acknowledgement contents.

12. A directional wireless radio communication apparatus providing decentralized spatial sharing between multiple wireless radio communication devices, comprising: (a) a wireless radio communication device, having a transmitter configured for generating beamformed directional radio transmissions to other wireless radio communication devices which are in range, and a receiver configured for receiving radio transmissions from stations comprising wireless radio communication devices; (b) a computer processor coupled to said transmitter and said receiver for controlling communications between itself and other stations; (c) a non-transitory computer-readable memory storing instructions executable by the computer processor; (d) wherein said instructions, when executed by the computer processor, which allow multiple pairs of peer-to-peer (P2P) stations to communicate simultaneously over a channel in a spatial vicinity without centralized control, having steps comprising: (d)(i) performing a beamforming training between stations in which every station acquires information on at least one best sector for transmitting information towards other stations and signal-to-noise level information for said best sector towards other stations so that signal-to-noise value for a link towards a peer station is checked to assure it exceeds a desired interference threshold; (d)(ii) performing spatial re-use at each station independently for initiating peer-to-peer (P2P) communication with other stations and responding to peer-to-peer requests from other stations; (d)(iii)(a) initiating P2P communications to a target station by using best beamforming sector information determined from beamforming training for: (d)(iii)(a)(1) determining that best sector for transmitting to that target station is different than best sectors for communicating with all other stations; (d)(iii)(a)(2) sending a P2P request to that target station, and (d)(iii)(a)(3) responding to an acknowledgement from that target station by transmitting P2P data to that target station; or (d)(iii)(b) responding to a P2P request from another station by using best beamforming sector information determined from beamforming training to: (d)(iii)(b)(1) determine that best sector to the initiating station is different than best sector for all other stations; (d)(iii)(b)(2) responding with an acknowledgement to said P2P request; (d)(iii)(b)(3) receiving P2P data from said initiator station; and (d)(iv) wherein said P2P communications are performed between peer stations without contention and without centralized control of the communication.

13. The apparatus of any preceding embodiment, wherein said beamforming training between stations further includes every station acquiring least sector information.

14. The apparatus of any preceding embodiment, wherein said least sector information comprises information about least "n" sectors, from which P2P initiator and responder stations determine P2P communications validity if the best sectors of a P2P link falls in the neighbor stations set of least sectors.

15. The apparatus of any preceding embodiment, wherein said beamforming training between stations further comprises obtaining signal-to-noise level information for said least sector information.

16. The apparatus of any preceding embodiment, wherein said P2P request contains field information comprising: (a) information about type of frame; (b) duration of the frame; (c) MAC address of the peer station and transmitting station.

17. The apparatus of any preceding embodiment, wherein said P2P request further comprises (a) information about P2P data allocations; and (b) extension flag to allow extending data allocation.

18. The apparatus of any preceding embodiment, wherein said P2P request further comprises a frame check sequence configured for validating reception of said P2P request.

19. The apparatus of any preceding embodiment, wherein said acknowledgement to said P2P request contains field information comprising: (a) information about type of frame; (b) frame duration; (c) MAC addresses of peer station and station transmitting acknowledgement; (d) ACK field indicating P2P request is accepted.

20. The apparatus of any preceding embodiment, wherein said P2P acknowledgement further comprises: (a) information about P2P data allocations; (b) extension flag to indicate if responder allows extending data allocation; and (c) a frame check sequence configured for validating reception of said P2P acknowledgement contents.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A directional wireless radio communication apparatus providing decentralized spatial sharing between multiple wireless radio communication devices, comprising:
   (a) a transmitter configured for generating beamformed directional radio transmissions to other wireless radio communication devices which are in range;
   (b) a receiver configured for receiving radio transmissions from stations comprising wireless radio communication devices;
   (c) a computer processor coupled to said transmitter and said receiver for controlling communications between itself and other stations;
   (d) a non-transitory computer-readable memory storing instructions executable by the computer processor;
   (e) wherein said instructions, when executed by the computer processor, which allow multiple pairs of peer-to-peer (P2P) stations to communicate simultaneously over a channel in a spatial vicinity without centralized control, having steps comprising:
      (i) performing a beamforming training between stations in which every station acquires information on at least one best sector for transmitting towards other stations;
      (ii) performing spatial re-use at each station independently for initiating peer-to-peer (P2P) communication with other stations and responding to peer-to-peer requests from other stations;
      (iii)(a) initiating P2P communications from an initiating station to a target station by using best beamforming sector information determined from beamforming training to: (iii)(a)(1) determining that best sector for transmitting to that target station is different than best sectors for communicating with all other stations; (iii)(a)(2) sending a P2P request to that target station, and (iii)(a)(3) responding to an acknowledgement from that target station by transmitting P2P data to that target station; or
      (iii)(b) responding to a P2P request from another station by using best beamforming sector information determined from beamforming training to: (iii)(b)(1) determine that best sector to the initiating station is different than best sector for all other stations; (iii)(b)(2) responding with an acknowledgement to said P2P request; (iii)(b)(3) receiving P2P data from said initiator station; and
      (iv) wherein said P2P communications are performed between peer stations without contention and without centralized control of the communication.

2. The apparatus as recited in claim 1, wherein said beamforming training between stations further comprises obtaining signal-to-noise level information for each of said best sectors towards other stations so that signal-to-noise value for a link towards a peer station is checked to assure it exceeds a desired interference threshold.

3. The apparatus as recited in claim 1, wherein said beamforming training between stations further comprises every station acquiring least sector information.

4. The apparatus as recited in claim 3, wherein said least sector information comprises information about least "n" sectors, from which P2P initiator and responder stations determine P2P communications validity if the best sectors of a P2P link falls in the neighbor stations set of least sectors.

5. The apparatus as recited in claim 3, wherein said beamforming training between stations further comprises signal-to-noise level information for said least sector information.

6. The apparatus as recited in claim 1, wherein said P2P request contains field information comprising: (a) information about type of frame; (b) duration of the frame; and (c) MAC address of the peer station and transmitting station.

7. The apparatus as recited in claim 6, wherein said P2P request further comprises (a) information about P2P data allocations; and (b) extension flag to allow extending data allocation.

8. The apparatus as recited in claim 6, wherein said P2P request further comprises a frame check sequence configured for validating reception of said P2P request.

9. The apparatus as recited in claim 1, wherein said acknowledgement to said P2P request contains field information comprising: (a) information about type of frame; (b) frame duration; (c) MAC addresses of peer station and station transmitting acknowledgement; (d) ACK field indicating P2P request is accepted.

10. The apparatus as recited in claim 9, wherein said P2P acknowledgement further comprises (a) information about P2P data allocations; and (b) extension flag to indicate if responder allows extending data allocation.

11. The apparatus as recited in claim 9, wherein said P2P acknowledgement further comprises a frame check sequence configured for validating reception of said P2P acknowledgement contents.

12. A directional wireless radio communication apparatus providing decentralized spatial sharing between multiple wireless radio communication devices, comprising:
   (a) a wireless radio communication device, having a transmitter configured for generating beamformed directional radio transmissions to other wireless radio communication devices which are in range, and a receiver configured for receiving radio transmissions from stations comprising wireless radio communication devices;
   (b) a computer processor within said wireless radio communication device and configured for controlling communications between itself and other stations;
   (c) a non-transitory computer-readable memory storing instructions executable by the computer processor;
   (d) wherein said instructions, when executed by the computer processor, which allow multiple pairs of peer-to-peer (P2P) stations to communicate simultaneously over a channel in a spatial vicinity without centralized control, having steps comprising:
      (i) performing a beamforming training between stations in which every station acquires information on at least one best sector for transmitting information towards other stations and signal-to-noise level information for each of said at least one best sector transmitting towards other stations so that signal-to-noise value for a link towards a peer station is checked to assure it exceeds a desired interference threshold;
      (ii) performing spatial re-use at each station independently for initiating peer-to-peer (P2P) communication with other stations and responding to peer-to-peer requests from other stations;
      (iii)(a) initiating P2P communications from an initiating station to a target station by using best beamforming sector information determined from beamforming training to: (iii)(a)(1) determining that best sector for transmitting to that target station is different than best sectors for communicating with all other stations; (iii)(a)(2) sending a P2P request to that target station, and (iii)(a)(3) responding to an acknowledgement from that target station by transmitting P2P data to that target station; or (iii)(b) responding to a P2P request from another station by using best beamforming sector information determined from beamforming training to: (iii)(b)(1) determine that best sector to the initiating station is different than best sector for all other stations; (iii)(b)(2) responding with an acknowledgement to said P2P request; (iii)(b)(3) receiving P2P data from said initiator station; and (iv) wherein said P2P communications are performed between peer stations without contention and without centralized control of the communication.

13. The apparatus as recited in claim 12, wherein said beamforming training between stations further comprises every station acquiring least sector information.

14. The apparatus as recited in claim 13, wherein said least sector information comprises information about least "n" sectors, from which P2P initiator and responder stations determine P2P communications validity if the best sectors of a P2P link falls in the neighbor stations set of least sectors.

15. The apparatus as recited in claim 13, wherein said beamforming training between stations further comprises obtaining the signal-to-noise level information for said least sector information.

16. The apparatus as recited in claim 12, wherein said P2P request contains field information comprising: (a) information about type of frame; (b) duration of the frame; (c) MAC address of the peer station and transmitting station.

17. The apparatus as recited in claim 16, wherein said P2P request further comprises (a) information about P2P data allocations; and (b) extension flag to allow extending data allocation.

18. The apparatus as recited in claim 16, wherein said P2P request further comprises a frame check sequence configured for validating reception of said P2P request.

19. The apparatus as recited in claim 12, wherein said acknowledgement to said P2P request contains field information comprising: (a) information about type of frame; (b) frame duration; (c) MAC addresses of peer station and station transmitting acknowledgement; (d) ACK field indicating P2P request is accepted.

20. The apparatus as recited in claim 19, wherein said P2P acknowledgement further comprises:
(a) information about P2P data allocations;
(b) extension flag to indicate if responder allows extending data allocation; and
(c) and a frame check sequence configured for validating reception of said P2P acknowledgement contents.

* * * * *